US011467317B2

(12) United States Patent
Bench et al.

(10) Patent No.: US 11,467,317 B2
(45) Date of Patent: Oct. 11, 2022

(54) ELECTROMAGNETIC MARKER DEVICES WITH SEPARATE RECEIVE AND TRANSMIT ANTENNA ELEMENTS

(71) Applicant: SeeScan, Inc.

(72) Inventors: Stephanie M. Bench, Carlsbad, CA (US); Mark S. Olsson, La Jolla, CA (US); Matthew D. Bockman, Del Mar, CA (US)

(73) Assignee: SEESCAN, INC., San Diego, CA (US)

( * ) Notice: Subject to any disclaimer, the term of this patent is extended or adjusted under 35 U.S.C. 154(b) by 253 days.

(21) Appl. No.: 16/908,625

(22) Filed: Jun. 22, 2020

(65) Prior Publication Data

US 2021/0231833 A1 Jul. 29, 2021

Related U.S. Application Data

(60) Provisional application No. 62/864,441, filed on Jun. 20, 2019.

(51) Int. Cl.
| | | |
|---|---|---|
| *G01V 15/00* | (2006.01) | |
| *H01Q 7/00* | (2006.01) | |
| *H01Q 1/24* | (2006.01) | |

(52) U.S. Cl.
CPC ............... *G01V 15/00* (2013.01); *H01Q 1/24* (2013.01); *H01Q 7/00* (2013.01)

(58) Field of Classification Search
None
See application file for complete search history.

(56) References Cited

U.S. PATENT DOCUMENTS

| | | |
|---|---|---|
| 4,334,227 A | 6/1982 | Marks |
| 4,712,094 A | 12/1987 | Bolson, Sr. |
| 4,761,656 A | 8/1988 | Cosman et al. |
| 4,791,412 A | 12/1988 | Brooks |
| 5,920,194 A | 7/1999 | Lewis et al. |

(Continued)

FOREIGN PATENT DOCUMENTS

| | | |
|---|---|---|
| EP | 0688438 | 12/1995 |
| WO | PCT/US03/069374 | 8/2003 |

(Continued)

OTHER PUBLICATIONS

International Searching Authority, "Written Opinion of the International Searching Authority" for PCT Patent Application PCT/US14/060981, dated Apr. 23, 2015, European Patent Office, Munich.

(Continued)

*Primary Examiner* — Trinh V Dinh
(74) *Attorney, Agent, or Firm* — Steven C. Tietsworth, Esq.; Michael J. Pennington, Esq

(57) ABSTRACT

A marker device embodiment may include separate concentrically-oriented receive and transmit antenna elements coupled to an ASIC which includes electronics to receive an input signal at a first frequency from a transmitter, convert the input signal to a power supply to power the electronic circuit, generate, in response to the input signal, an output signal at a second frequency different from the first frequency, and provide the output signal, via the transmit antenna element, to an above-ground receiver for assistance in determining the location of a buried utility.

21 Claims, 12 Drawing Sheets

(56) References Cited

U.S. PATENT DOCUMENTS

| | | | |
|---|---|---|---|
| 6,377,203 B1 | 4/2002 | Doany | |
| 6,388,575 B1* | 5/2002 | Galloway | G01V 15/00 340/572.1 |
| 6,617,856 B1 | 9/2003 | Royle et al. | |
| 6,954,072 B1 | 10/2005 | Schlapp et al. | |
| 8,013,610 B1 | 9/2011 | Merewether et al. | |
| 8,727,217 B2 | 5/2014 | Balachandran et al. | |
| 2007/0257800 A1* | 11/2007 | Yang | G06K 19/073 343/841 |
| 2013/0099790 A1* | 4/2013 | Doany | H01Q 21/24 343/728 |
| 2013/0257434 A1 | 10/2013 | Edwards et al. | |
| 2017/0299757 A1 | 10/2017 | Bench et al. | |

FOREIGN PATENT DOCUMENTS

| | | |
|---|---|---|
| WO | PCT/US07/257800 | 11/2007 |
| WO | PCT/US13/033924 | 3/2013 |
| WO | PCT/US13/099790 | 4/2013 |
| WO | PCT/US13/148714 | 10/2013 |

OTHER PUBLICATIONS

International Searching Authority, "Written Opinion of the International Searching Authority" for PCT Patent Application No. PCT/US2017/018212, dated Aug. 24, 2017, European Patent Office, Munich.

International Searching Authority, "Written Opinion of the International Searching Authority" for PCT Patent Application PCT/US19/038585, dated Jan. 4, 2020, European Patent Office, Munich.

* cited by examiner

ELECTROMAGNETIC MARKER DEVICES WITH SEPARATE RECEIVE AND TRANSMIT ANTENNA ELEMENTS

CROSS-REFERENCE TO RELATED APPLICATIONS

This application claims priority under 35 U.S.C. § 119(e) to U.S. Provisional Patent Application Ser. No. 62/864,441, entitled ELECTROMAGNETIC MARKER DEVICES WITH SEPARATE RECEIVE AND TRANSMIT ANTENNA ELEMENTS, filed on Jun. 20, 2019, the content of which is hereby incorporated by reference herein in its entirety for all purposes.

FIELD

This disclosure relates generally to radiofrequency electromagnetic marker devices. More specifically, but not exclusively, the disclosure relates to buriable marker devices for use in locating underground utilities or other objects.

BACKGROUND

The evolving complexity of infrastructure requires precise known location and identification of utilities, such as buried utility lines or buried utilities (e.g., underground power lines, gas lines, phone lines, fiber optic cable conduits, cable television (CATV) cables, sprinkler control wiring, water pipes, sewer pipes, etc.) for purposes of enhancement, replacement, and/or repair. Such utility lines, collectively and individually which will herein be referred to as "buried objects" or "buried utilities," may be buried under the ground and/or otherwise hidden from normal sight and/or access. Construction and/or excavation operations often require the locations and/or identification of such utility lines to be known so as to avoid costly and hazardous destruction of infrastructure, for example rupturing buried metallic gas lines or power cables.

In utility locating operations, different types of markers have been used to indicate the presence of such buried utilities or other objects. Probably the most commonly known markers are above-ground aerosol paint or flag markers of different colors to indicate on the ground surface the location and type of buried utility or other objects. Such paint or flag markers are usually color-coded according to the type of buried object they denote. Other kinds of markers include conventional underground marker devices, such as marker balls (e.g., those made by 3M), that are placed near the objects to be marked while being placed in the ground and generally buried with the objects using infill. Conventional marker devices, such marker balls, are passive devices that include a tuning circuit, which upon receiving a signal transmitting electromagnetic energy at a specific frequency, resonate at or near the same frequency. For instance, the received signal must be at or near enough to the resonant frequency to energize the marker device.

Such marker balls and other conventional marker devices, though advantageous over the above-ground paint and flag markers prone to chipping and fading, suffer from numerous drawbacks. For example, existing marker balls or other conventional marker devices often have little control over the received electromagnetic energy, which is often affected by the device's form factor, component construction, manufacturing tolerances, underground environmental conditions (e.g., wet or otherwise conductive soil or other conditions affecting electromagnetics), where the marker balls or other conventional marker devices are placed, etc. Likewise, the output signal of such marker balls or other conventional marker devices are typically at the same frequency or nearly same frequency of the received input signal, resulting in backscattering at the receiver, which can result in substantial interference, thereby making detection of the marker balls difficult and/or error prone. The few conventional marker devices that do have some control over the received electromagnetic energy do so in order to modulate the signal (e.g., generally through phase or amplitude or frequency signal keying) in order to communicate data rather than to improve device performance. Consequently, such conventional marker devices that modulate signals suffer from the same performance drawbacks as other conventional marker devices.

Accordingly, there is a need in the art to address the above-described as well as other problems related to underground marker devices and associated systems.

SUMMARY

This disclosure relates generally to marker devices. More specifically, but not exclusively, the disclosure relates to marker devices that are placed underground for locating buried objects.

According to various aspects of the present disclosure, marker devices may be placed below a ground surface in proximity to a buried object for the purpose of locating such object when required. The marker device may include a physically separate receive antenna element and transmit antenna element disposed concentrically in a housing of dielectric material. Spacing between the receive antenna element and transmit antenna element may be sufficient to decouple resonance of the separate antenna elements. The receive antenna element may comprise one or more loop or disc shaped conductive windings tuned to the frequency of an input signal broadcast from an above-ground transmitter device. The transmit antenna element may include one or more loop or disc shaped conductive windings configured to transmit a second frequency of an output signal. An electronic circuit, including a circuit board, may be disposed between the receive antenna element and transmit antenna element wherein traces on the circuit board may individually electrically connect to the conductive windings of the receive antenna element and transmit antenna element. The electronic circuit may further include various elements including an input circuit to receive the input signal from an above-ground transmitter at the first frequency, a power circuit to convert the input signal to a power supply for powering the electronic circuit, a processing element to generate the output signal at a second frequency responsive to the input signal where the output signal may be outside the resonant range of the first frequency, and an output circuit to provide the output signal at the second frequency to the coupled transmit antenna element. The output signal may further be broadcast and received at an above-ground receiver to assist in determining the location of a buried object associated with the marker device.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying Drawings, wherein.

DETAILED DESCRIPTION OF EMBODIMENTS

Terminology

Figure 1:
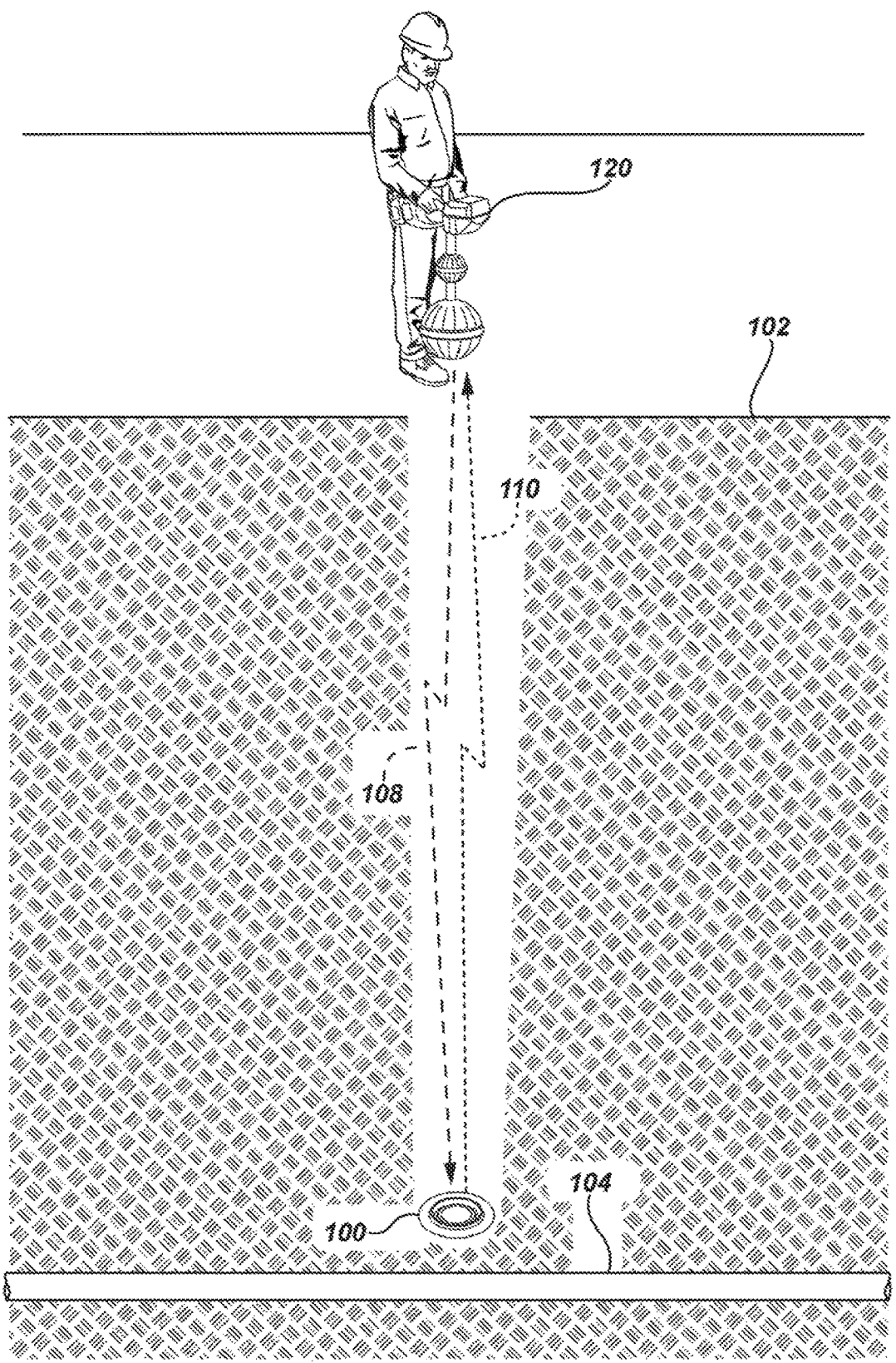
FIG. 1 is an illustration of an marker device placed below a ground surface in proximity to a buried object.

As used herein, the term "input signal" may refer to a signal at a first frequency that may be transmitted by an "above-ground transmitter device" which may further be received at one or more marker devices described herein. The "above-ground transmitter device" may be or include a "utility locating device" as described below and/or a stand-alone device and/or other radio transmitter capable of generating the required input signal frequency.

The received input signal may be used to power the marker device and generate an "output signal" at a second frequency that is substantially different than the first frequency of the input signal. For instance, the "substantial" difference may refer to a frequency difference in the output signal where the output signal frequency is outside the "resonant range" of the input signal frequency. Such a "resonant range" may be the natural frequency of the marker device and frequencies near enough to the natural frequency wherein resonance may occur when such a signal is received at the marker device.

Whereas some conventional marker devices known in the art may use frequency signal keying (FSK) or other frequency modulation techniques to communicate information or data, such frequency differences (and associated signal bandwidth) remain well in the resonant range of a conventional marker device's resonant frequency and are not for performance purposes. In some marker devices in keeping with the present disclosure, the output signal may likewise be modulated to communicate data.

The output signal may be broadcast by the marker device and further received at an "above-ground receiver. The "above-ground receiver" may be or include a "buried utility locating device" as described below and/or a standalone device and/or other radio receiver capable of receiving the output signal frequency and generally use the output signal to determine the location of the marker device and any associated buried object. Marker devices as described herein may be used in exemplary embodiments for marking and later identifying buried utilities (e.g., pipes or wires buried in the ground) in conjunction with a buried utility locator, however, they may also be used for other marking applications without a buried utility locator.

The term "utility locating device" or "buried utility locating device" may include any device or system configured to determine the position and orientation of one or more utility lines which may be buried in the ground. In some embodiments, the utility position and orientation estimating devices may be or include one or more "magnetic field sensing locating devices" also referred to herein as "utility locators," "utility locator devices," "locating devices," and "locators." Such magnetic field sensing locating devices may refer to devices for sensing and measuring "signals" or radiation of electromagnetic energy, typically using coils for sensing AC magnetic field signals generated by currents flowing in buried utilities or from magnetic field dipole sonde devices which generate an AC dipole magnetic field.

The magnetic field sensing locating devices described herein may further process the received signals to determine information about hidden or buried conductors (e.g., underground utilities such as pipes, conduits, or cables) and the associated underground environment, which may be done at discrete points in the surveyed area. In the utility locating device embodiments of the present disclosure, the utility locating device may be both an above-ground transmitter and an above-ground receiver. As such, the utility locating device may be configured to both transmit input signals to the marker devices and receive output signals from the marker devices to determine the location of the marker device and any associated object which may be buried in the ground.

Overview

This disclosure relates generally to marker devices. More specifically, but not exclusively, the disclosure relates to marker devices that are placed underground for locating buried objects.

According to various aspects of the present disclosure, marker devices may be placed below a ground surface in proximity to a buried object for the purpose of locating such object when required. The marker device may include a physically separate receive antenna element and transmit antenna element disposed concentrically in a housing of dielectric material. Spacing between the receive antenna element and transmit antenna element may be sufficient to decouple resonance of the separate antenna elements. The receive antenna element may comprise one or more loop or disc shaped conductive windings tuned to the frequency of an input signal broadcast from an above-ground transmitter device. The transmit antenna element may include one or more loop or disc shaped conductive windings configured to transmit a second frequency of an output signal. An electronic circuit, including a circuit board, may be disposed between the receive antenna element and transmit antenna element wherein traces on the circuit board may individually electrically connect to the conductive windings of the receive antenna element and transmit antenna element. The electronic circuit may further include various elements including an input circuit to receive the input signal from an above-ground transmitter at the first frequency, a power circuit to convert the input signal to a power supply for powering the electronic circuit, a processing element to generate the output signal at a second frequency responsive to the input signal where the output signal may be outside the resonant range of the first frequency, and an output circuit to provide the output signal at the second frequency to the coupled transmit antenna element. The output signal may further be broadcast and received at an above-ground receiver to assist in determining the location of a buried object associated with the marker device.

Details of the systems, devices, and methods referred to herein and additional components, methods, and configurations that may be used in conjunction with the embodiments described subsequently herein are disclosed in co-assigned patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACKING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 9,625,602, issued Apr. 18, 2017, entitled SMART PERSONAL COMMUNICATION DEVICES AS USER INTERFACES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKETS AND HELICAL COIL TYPE ELECTRICAL CORDS; U.S. Pat. No. 7,969,151, issued Jun. 28, 2011, entitled PRE-AMPLIFIER AND MIXER CIRCUITRY FOR A LOCATOR ANTENNA; U.S. Pat. No. 8,013,610, issued Sep. 6, 2011, entitled HIGH-Q SELF TUNING LOCATING TRANSMITTER; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 8,248,056, issued Aug. 21, 2012, entitled BURIED OBJECT LOCATOR SYSTEM EMPLOYING AUTOMATED VIRTUAL DEPTH EVENT DETECTION AND SIGNALING; U.S. Pat. No. 9,599,499, issued Mar. 21, 2017, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,638,824, issued May 2, 2017, entitled QUAD-GRADIENT COILS FOR USE IN LOCATING SYSTEMS; U.S. patent application Ser. No. 13/769,202, filed Feb. 15, 2013, entitled SMART PAINT STICK DEVICES AND METHODS; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,547,428, issued Oct. 1, 2013, entitled PIPE MAPPING SYSTEM; U.S. Pat. No. 8,635,043, issued Jan. 21, 2014, entitled Locator and Transmitter Calibration System; U.S. Pat. No. 9,632,199, issued Apr. 25, 2017, entitled INDUCTIVE CLAMP DEVICES, SYSTEMS, AND METHODS; U.S. Pat. No. 9,057,754, issued Jun. 16, 2015, entitled ECONOMICAL MAGNETIC LOCATOR APPARATUS AND METHOD; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR PORTABLE LOCATOR; U.S. Pat. No. 9,341,740, issued May 17, 2016, entitled OPTICAL GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. patent application Ser. No. 15/345,421, filed Nov. 7, 2016, entitled OMNI-INDUCER TRANSMITTING DEVICES AND METHODS; U.S. Pat. No. 9,488,747, issued Nov. 8, 2016, entitled DUAL ANTENNA SYSTEMS WITH VARIABLE POLARIZATION; U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/457,149, filed Mar. 13, 2017, entitled USER INTERFACES FOR UTILITY LOCATOR; U.S. patent application Ser. No. 15/457,222, filed Mar. 13, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. patent application Ser. No. 15/470,642, filed Mar. 27, 2017, entitled UTILITY LOCATING APPARATUS AND SYSTEMS USING MULTIPLE ANTENNA COILS; U.S. patent application Ser. No. 15/470,713, filed Mar. 27, 2017, entitled UTILITY LOCATORS WITH PERSONAL COMMUNICATION DEVICE USER INTERFACES; U.S. patent application Ser. No. 15/483,924, filed Apr. 10, 2017, entitled SYSTEMS AND METHODS FOR DATA TRANSFER USING SELF-SYNCHRONIZING QUADRATURE AMPLITUDE MODULATION (QAM); U.S. patent application Ser. No. 15/485,082, filed Apr. 11, 2017, entitled MAGNETIC UTILITY LOCATOR DEVICES AND METHODS; U.S. patent application Ser. No. 15/485,125, filed Apr. 11, 2017, entitled INDUCTIVE CLAMP DEVICES, SYSTEMS, AND METHODS; U.S. patent application Ser. No. 15/490,740, filed Apr. 18, 2017, entitled NULLED-SIGNAL UTILITY LOCATING DEVICES, SYSTEMS, AND METHODS; U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES; U.S. patent application Ser. No. 15/590,964, filed May 9, 2017, entitled BORING INSPECTION SYSTEMS AND METHODS; U.S. patent application Ser. No. 15/623,174, filed Jun. 14, 2017, entitled TRACKABLE DIPOLE DEVICES, METHODS, AND SYSTEMS FOR USE WITH MARKING PAINT STICKS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,684,090, issued Jun. 20, 2017, entitled NULLED-SIGNAL LOCATING DEVICES, SYSTEMS, AND METHODS; U.S. patent application Ser. No. 15/633,682, filed Jun. 26, 2017, entitled BURIED OBJECT LOCATING DEVICES AND METHODS; U.S. Pat. No. 9,696,448, filed Jul. 4, 2017, entitled GROUND-TRACKING DEVICES AND METHODS FOR USE WITH A UTILITY LOCATOR; U.S. patent application Ser. No. 15/681,409, filed Aug. 20, 2017, entitled WIRELESS BURIED PIPE AND CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,784,837, issued Oct. 10, 2017, entitled OPTICAL ROUND TRACKING APPARATUS, SYSTEMS AND METHODS; U.S. Pat. No. 9,798,033, issued Oct. 24, 2017, entitled SONDE DEVICES INCLUDING A SECTIONAL FERRITE CORE; U.S. patent application Ser. No. 15/811,361, filed Nov. 13, 2017, entitled OPTICAL GROUND TRACKING APPARATUS, SYSTEMS, AND METHODS; U.S. Pat. No. 9,841,503, issued Dec. 12, 2017, entitled OPTICAL GROUND TRACKING APPARATUS, SYSTEMS, AND METHODS; U.S. patent application Ser. No. 15/846,102, filed Dec. 18, 2017, entitled SYSTEMS AND METHODS FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. Pat. No. 9,880,309, issued Jan. 30, 2018, entitled UTILITY LOCATOR TRANSMITTER APPARATUS AND METHODS; #U.S. patent application Ser. No. 15/889,067, filed Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. Pat. No. 9,927,545, issued Mar. 27, 2018, entitled MULTI-FREQUENCY LOCATING SYSTEMS AND METHODS; U.S. Pat. No. 9,927,546, filed Mar. 27, 2018, entitled PHASE-SYNCHRONIZED BURIED OBJECT TRANSMITTER AND LOCATOR METHODS AND APPARATUS; U.S. Pat. No. 9,928,613, issued Mar. 27, 2018, entitled GROUND TRACKING APPARATUS, SYSTEMS, AND METHODS; U.S. Pat. No. 9,959,641, issued May 1, 2018, entitled METHODS AND SYSTEMS FOR SEAMLESS TRANSITIONING IN INTERACTIVE MAPPING SYSTEMS; U.S. Pat. No. 10,027,526, issued Jul. 17, 2018, entitled METHODS AND APPARATUS FOR HIGH-SPEED DATA TRANSFER EMPLOYING SELF-SYNCHRONIZING QUADRATURE AMPLITUDE MODULATION (QAM); U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. Pat. No. 10,073,186, issued Sep. 11, 2018, entitled KEYED CURRENT SIGNAL UTILITY LOCATING SYSTEMS AND METHODS; U.S. Pat. No. 10,078,149, issued Sep. 18, 2018, entitled BURIED OBJECT LOCATOR APPARATUS AND SYSTEMS; U.S. Pat. No. 10,082,599, issued Sep. 25, 2018, entitled MAGNETIC SENSING BURIED OBJECT LOCATOR INCLUDING A CAMERA; U.S. patent application Ser. No. 16/144,878, filed Sep. 27, 2018, entitled MULTIFUNCTION BURIED UTILITY LOCATING CLIPS; U.S. patent application Ser. No. 16/178,494, filed Nov. 1, 2018, entitled THREE-AXIS MEASUREMENT MODULES AND SENSING METHODS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent Ser. No. 16/449,187, filed Jun. 21, 2019, entitled ACTIVE MARKER DEVICES FOR UNDERGROUND USE;

U.S. Pat. No. 10,247,845, issued Apr. 2, 2019, entitled UTILITY LOCATOR TRANSMITTER APPARATUS AND METHODS; U.S. Utility patent application Ser. No. 16/382,136, filed Apr. 11, 2019, entitled GEOGRAPHIC MAP UPDATING METHODS AND SYSTEMS; U.S. Pat. No. 10,274,632, issued Apr. 30, 2019, entitled UTILITY LOCATING SYSTEMS WITH MOBILE BASE STATION; U.S. Provisional Patent Application 62/870,443, filed Jul. 3, 2019, entitled AUTOTUNING MODULES; U.S. Pat. No. 10,353,103, filed Jul. 16, 2019, entitled SELF-STANDING MULTI-LEG ATTACHMENT DEVICES FOR USE WITH UTILITY LOCATORS; U.S. Pat. No. 10,371,305, issued Aug. 6, 2019, entitled DOCKABLE TRIPODAL CAMERA CONTROL UNIT; U.S. Pat. No. 10,401,526, issued Sep. 3, 2019, entitled BURIED UTILITY MARKER DEVICES, SYSTEMS, AND METHODS; U.S. Provisional patent Application 62/899,296, filed Sep. 12, 2019, entitled ANTENNA SYSTEMS FOR CIRCULARLY POLARIZED RADIO SIGNALS; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES. The content of each of the above-described patents and applications is incorporated by reference herein in its entirety. The above-described patent applications and patents may be referred to herein collectively as the "co-assigned applications" or "incorporated applications."

As used herein, the term "buried objects" include utilities below the surface of the ground and utilities that are otherwise obscured, covered, or hidden from direct view or access, such as within walls, cavities, etc. In a typical application a buried object is a pipe, cable, conduit, wire, or other object made of a conductive material (e.g., metal, metal alloys, etc.) or a non-conductive material, (e.g., plastic, concrete, ceramic, etc.) buried under the ground surface, at a depth of from a few centimeters to meters or more, that a user, such as a utility company employee, construction company employee, homeowner, or other wants to locate, map (e.g., by the position), and/or mark its location. Example utilities include water or other fluid pipelines, sewer lines, electrical power lines, electrical or optical signaling lines, gas lines, and the like.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure. As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

In one aspect, a marker device in keeping with the present disclosure may include a platform disposed in the center of a loop or disc shaped housing for securing one or more labels. In some embodiments, the platform may be moveably coupled to the housing of the marker device. For instance, the moveable platform may be attached to, yet mechanically decoupled from, the housing to such an extent that may allow the label platform to move and shift without influencing the placement position of the marker device in the ground. The label or labels may identify the particular marker device and/or information regarding the associated utility line or other buried object and/or the owner of the marker device and/or other related data.

In another aspect, the electronic circuit of a marker device in keeping with the present disclosure may be or include an application-specific integrated circuit (ASIC).

In another aspect, the above-ground transmitter may be built into a utility locating device.

In another aspect, the above-ground receiver may be a utility locating device.

In another aspect, the conductive windings of the receive antenna element and the transmit antenna element of a marker device in keeping with the present disclosure may be traces on a circuit board of the electronic circuit.

In another aspect, the electronic circuit of a marker device in keeping with the present disclosure may include one or more non-transitory memories for storing programmed instructions to control the various circuit elements of the marker device.

In another aspect, the marker device of the present disclosure may include desiccant in one or more internal locations.

In another aspect, the housing of marker devices described herein may, in some embodiments, be formed through spin welding or laser welding or fusion welding.

In another aspect, the marker devices of the present disclosure may be disposed in a hollow ball partially filled with fluid such that the marker device is self-righting.

In another aspect, the marker devices of the present disclosure may be disposed in a hollow ball weighted along one side.

Various additional aspects, features, and functionality are further described below in conjunction with the appended Drawings.

EXAMPLE EMBODIMENTS

As shown in FIG. 1, an example buried utility marker device 100 (hereinafter referred to as a "marker device") may be placed under a ground surface 102 near or above a buried object 104 (e.g., the associated utility line) for locating the buried object 104 when required. The ground surface 102 may be, for example, dirt or grass, a roadway, a sidewalk, a building floor, and the like under which the buried object(s) and the marker device(s) are placed.

In an example illustrated in FIG. 1, the marker device 100 may receive an input signal 108 from an above-ground transmitter which may be built into a utility locating device 120. The input signal 108 may comprise a continuous or pulsed radio frequency signal having a first frequency to energize the underground placed marker device 100. Energization may take place, for example, via extracting a portion or more of the electrometric energy from the input signal 108 and converting it into a power supply that may be used to power on one or more of the circuit elements within the marker device 100.

When powered on, the marker device 100 may generate an output signal 110, which may also be a continuous or pulsed radio frequency signal but may be at a second frequency different from the frequency of the received input signal 108. The output signal 110 may be at a frequency substantially higher or lower than that of the input signal 108. For instance, the output signal 110 may be outside the resonant range of the input signal 108 frequency. While some conventional marker devices known in the art may use frequency shift keying or otherwise modulate frequencies to communicate information or data, such frequency differences remain in the resonant range of the marker devices resonant frequency (e.g., a reference bandwidth, such as a 3 dB bandwidth of the modulated signal, is within the resonant range). The second frequency may generated by electronic circuitry in the marker device by a multiple, generated, for example, by dividing down the input signal frequency by a multiple of 2 or more (i.e., of the first frequency).

For example, the input signal 108 may be divided down by a predefined multiple value, such as 128 or other divisor values, to generate the output signal 110. For instance, if the input signal 108 is at a first frequency of, for example, 13,560,000 Hz, the output signal 110 may be generated at a frequency of 105,937.5 Hz. Other frequencies and divide ratios may alternatively be used in various embodiments based on particular operating environments, regulatory constraints, device constraints (e.g., power reduction, etc.), signal loss, and the like.

The generated output signal 110 may be received by an above-ground receiver, which may be the utility locating device 120, to assist in determining the location of the buried object 104.

The utility locating device 120 may be or share aspects with the utility locating devices also referred to as buried object locators, utility locators, or simply locators as disclosed in the incorporated applications, in particular, commonly assigned U.S. Pat. No. 9,746,572, issued Aug. 29, 2017, entitled ELECTRONIC MARKER DEVICES AND SYSTEMS, the contents of which are incorporated by reference herein in their entirety.

Alternatively, the devices to transmit the input signals to the marker device and/or receive output signals from the marker device may be separate transmitter and receiver devices which may or may not be or include a utility locating device such as the utility locating device 120 of FIG. 1. The transmitter may be any radio transmitter capable of generating the required output frequency, or it may be a stand-alone marker excitation device as disclosed in the incorporated applications including commonly assigned U.S. Pat. No. 10,401,526 issued Sep. 3, 2019 entitled BURIED UTILITY MARKER DEVICES, SYSTEMS, AND METHODS, the contents of which are incorporated by reference herein in their entirety. Further, the receiver may be any radio receiver capable of receiving with required sensitivity a signal of the transmitted frequency, or it may be or include an antenna array arrangement included within a buried object locator disclosed in the incorporated applications including commonly assigned U.S. Pat. No. 10,401,526 issued Sep. 3, 2019 formerly U.S. patent application Ser. No. 15/434,056, filed Feb. 16, 2016, entitled BURIED UTILITY MARKER DEVICES, SYSTEMS, AND METHODS, the contents of which are incorporated by reference herein in their entirety.

Further details of one embodiment of a marker device in accordance with aspects of the present disclosure, along with associated components, are described with reference to the FIGS. 2A-2C which may be the same as or share aspects with the marker device 100 of FIG. 1.

Figure 2A:
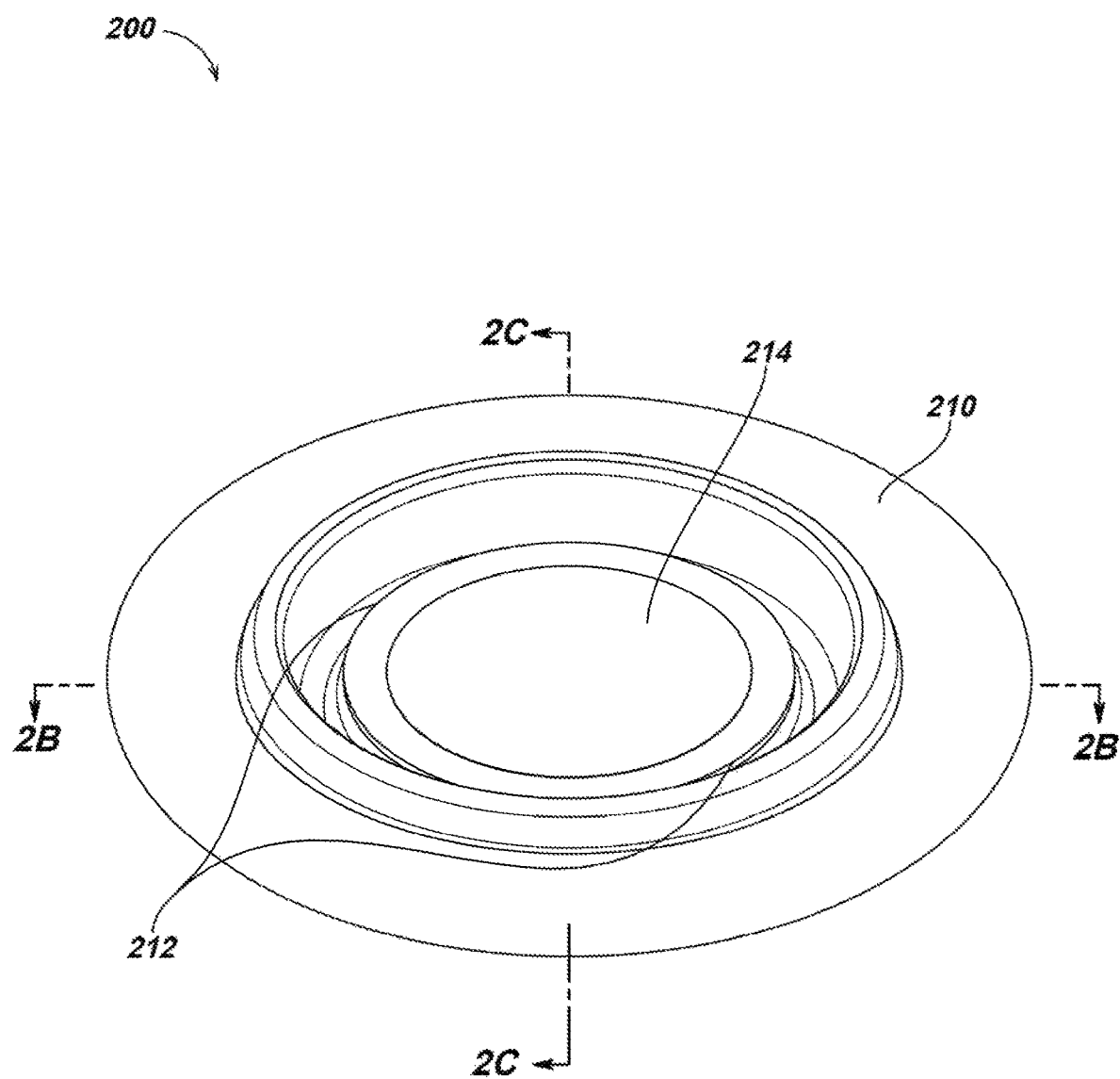
FIG. 2A is an isometric view of an marker device embodiment.

As shown in the FIG. 2A, in an exemplary embodiment a marker device 200 may include a loop or disc shaped protective housing 210 made of a material having a low dielectric constant (e.g., polymers such as those having low dielectric constants: polypropylene (2.2-2.36), polyethylene (2.25), polystyrene (2.4-2.7), polytetrafluoroethylene (2.25), or other materials having a similarly low dielectric constant number), and it may additionally enclose air, to reduce capacitive coupling to the ground or underground environment in which the marker device 200 is buried. In some embodiments the protective housing may, alternately, be in a different shape such as a square shape, rectangular shape, triangular shape, or other shape in two or three dimensions such as a cube shape, sphere shape, pyramid shape, and the like.

The housing 210 may protect the conductive windings of the receive antenna element (e.g., receive antenna element 220 of FIGS. 2B and 2C), transmit antenna element (e.g., transmit antenna element 230 of FIGS. 2B and 2C), and electronic circuit (e.g., electronic circuit 240 of FIGS. 2B and 2C) from corrosive and otherwise damaging elements in the underground environment, typically over a time period of years to decades. For long term applications, the housing materials may include materials that are designed not to break down or otherwise degrade in mechanical structure and integrity over a time period of decades or longer, and the electronics internal to the housing may likewise be designed from materials and/or sealed/potted to resist damage from the environment and breakdown over extended time periods.

By appropriate spacing, the housing 210 and the physical distance created from the conductive windings of the antenna elements and electronic circuit may be selected to reduce capacitive coupling of both input and output signals with the soil or other conductive elements in the soil or other ground or environmental materials, thereby reducing detuning of the marker device 200. The housing may further prevent ingress of ions or other contaminants, further reducing detuning of the marker device 200.

The marker device 200, as well as other marker device embodiments, may optionally include a platform 212 positioned in the center of the loop or disc shaped housing for securing one or more labels such as label 214. The platform may include a flat surface or other shape for attachment of labels thereto and may be textured to optimize attachment of the labels.

The platform 212 may be moveably coupled to the housing of the marker device 200. For instance, a moveable platform 212 may be attached to housing 210 yet mechanically decoupled from the housing 210 to such an extent that the label platform 212 may move and shift without influencing the placement position of marker device 200 in the ground. The moveable platform 212 may reduce the transfer stress and deformation to antenna elements (e.g., receive antenna element 220 and transmit antenna element 230 of FIGS. 2B and 2C) and/or other internal electronics (e.g., electronic circuit 240 of FIGS. 2B and 2C) due to the process of burying marker device 200 and/or soil compaction. The labels, such as label 214, may identify the particular marker device and/or information regarding the associated utility line and/or owner of the marker device and/or other related data.

Figure 2B:
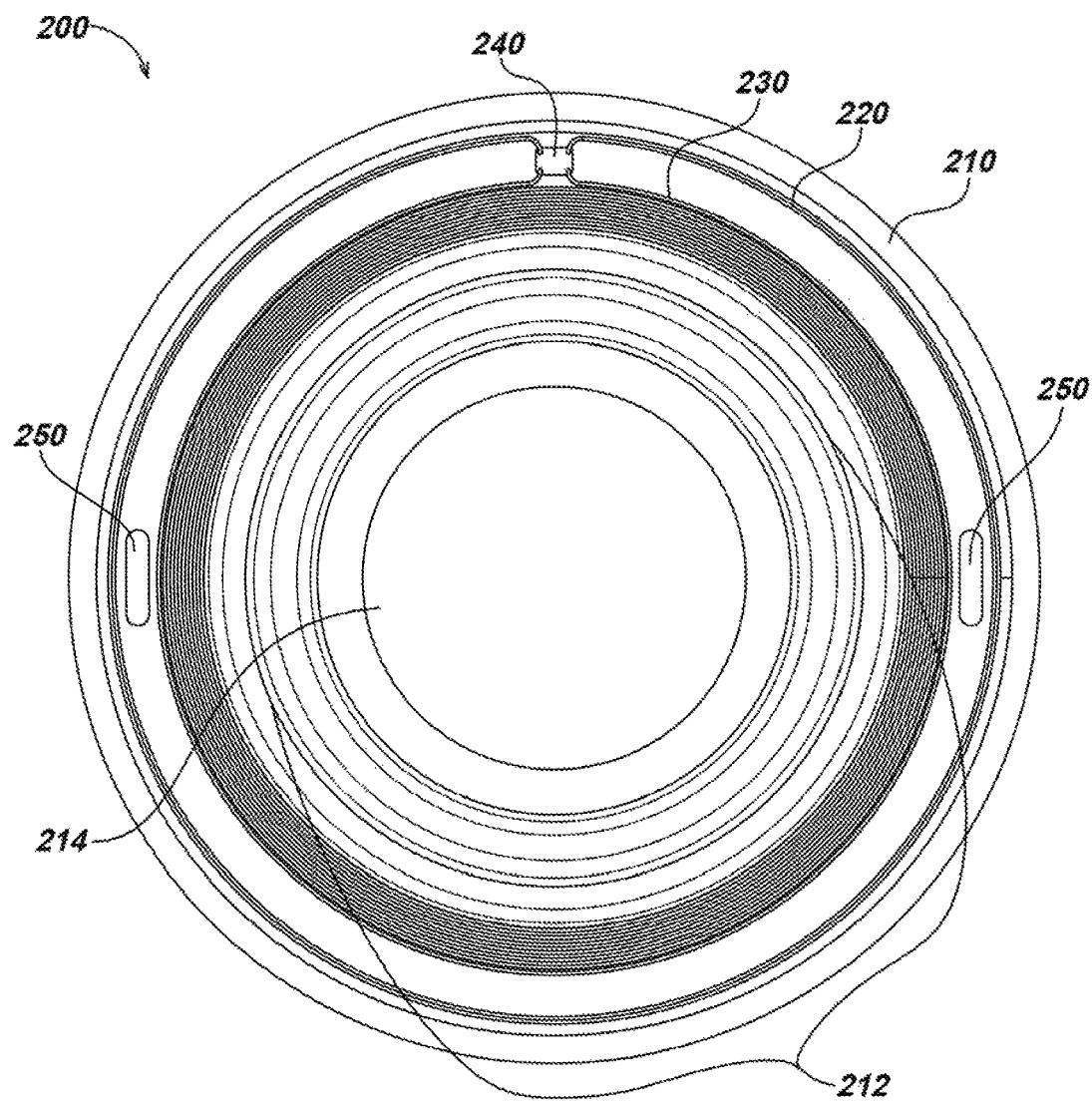
FIG. 2B is a section view of the marker device from FIG. 2A along line 2B-2B.
Figure 2C:
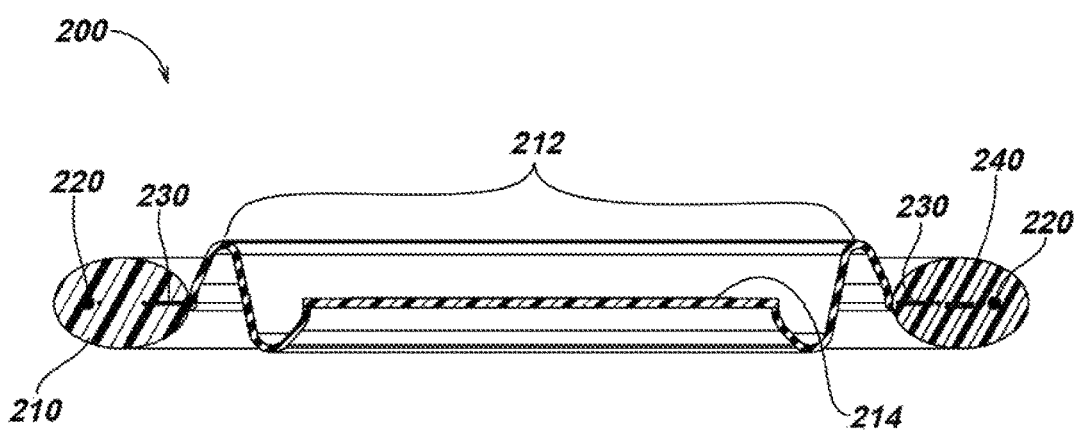
FIG. 2C is a section view of the marker device from FIG. 2A along line 2C-2C.

Turning to FIGS. 2B and 2C, the marker device 200 may include a receive antenna element 220 and a transmit antenna element 230 physically spaced apart from each other concentrically and disposed in a housing 210. Spacing between the receive antenna element 220 and transmit antenna element 230 may be selected to decouple the resonance of the separate antenna elements. The receive antenna element 220 may comprise one or more loop or disc shaped conductive windings to receive an input signal, such as signal 108 of FIG. 1, at a first frequency from an above-ground transmitter device, such as the utility locating device 120 of FIG. 1. The conductive winding(s) of the receive antenna element 220 may be tuned to the first frequency of the input signal. For instance, the conductive winding(s) of the receive antenna element 220 may be 12 AWG copper clad wire resonant at a 13.56 MHz first frequency input signal. In other embodiments, other wire types or gauges of wire may be used wherein the receive antenna element is otherwise tuned to the particular frequency of the input signal.

The transmit antenna element 230 may include one or more loop or disc shaped conductive windings configured to broadcast an output signal, such as the output signal 110 of FIG. 1, at a different frequency than the input signal received at the receive antenna element 220. For instance, the transmit antenna element 230 may have 20 turns of wire that may be used to broadcast an output signal at 105,937.5 Hz. In other embodiments, other configurations of conductive windings having various quantities of turns may be used.

An electronic circuit 240 may be disposed between the receive antenna element 220 and transmit antenna element 230 wherein traces on the circuit board may individually electrically connect to the conductive windings of the receive antenna element 220 and transmit antenna element 230. Electronic circuit 240 may be configured with an input circuit (e.g., input circuit 544 of FIG. 5) coupled to the receive antenna element 220 to receive an input signal that may be broadcast from an above-ground transmitter (e.g., built into a utility locating device or other separate transmitter device).

The electronic circuit 240 may further include a power circuit (e.g., power circuit 546 of FIG. 5) which may extract a portion or more of the electrometric energy from the input signal and convert it into a power supply to power the marker device 200. A processing element (e.g., processing element 550 of FIG. 5) included in the electronic circuit 240 may generate the output signal at a second frequency different from the frequency of the received input signal. The output signal at the second frequency may be generated, for example, by dividing down the input signal frequency by a predefined value, such as 128 or other divisor values, to generate the output signal. Other frequencies and divide ratios may alternatively be used in various embodiments based on particular operating environments, regulatory constraints, device constraints (e.g., power reduction, etc.), signal loss, and the like.

The electronic circuit 240 may include an output circuit (e.g., output circuit 548 of FIG. 5) to provide the output signal to the transmit antenna element 230 which may further broadcast the output signal received by an above-ground receiver (e.g., utility locating device 120 of FIG. 1). In some embodiments, the circuit elements may further include one or more non-transitory memories for storing programmed instruction used in controlling the circuit elements of electronic circuit 240 and marker device 200. The receiver element may further use the received output signal to determine the location of a marker device, such as the marker device 200, as well as associated utility lines or other objects. The electronic circuit 240 of marker device 200 may, in some embodiments, be an application-specific integrated circuit (ASIC).

As illustrated in FIG. 2B, the marker device 200 may optionally include desiccant 250 in one or more internal locations in housing 210. The desiccant 250 may keep internal humidity low and thus aid in preventing damage to the internal electronics such as electronic circuit 240.

Figure 3A:
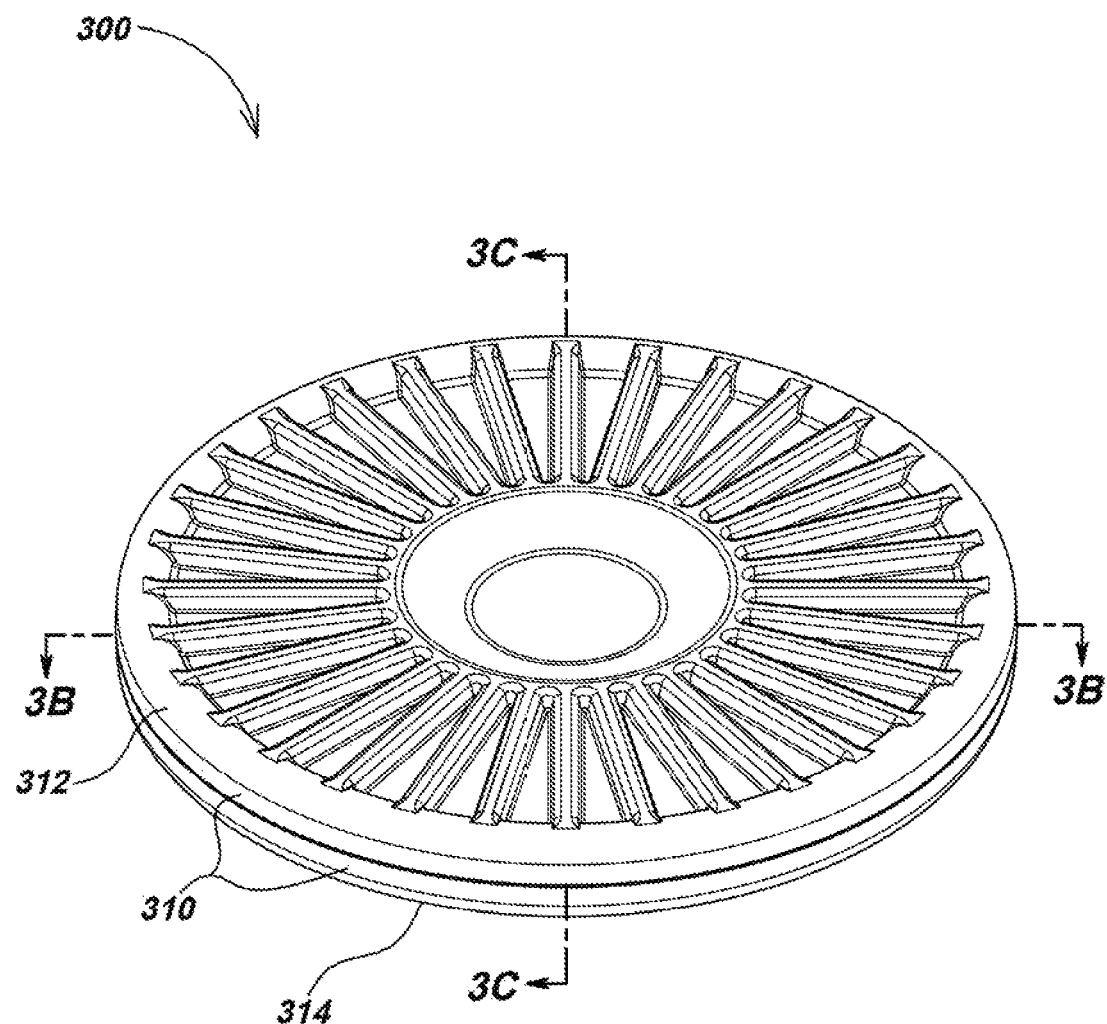
FIG. 3A is an isometric view of another marker device embodiment.

Turning to FIG. 3A, another marker device 300 in keeping with the present disclosure is illustrated. The marker device 300 may include a loop or disc shaped protective housing 310 made of materials having a low dielectric constant (e.g., polymers such as those having low dielectric constants: polypropylene (2.2-2.36), polyethylene (2.25), polystyrene (2.4-2.7), polytetrafluoroethylene (2.25), or other materials having a similarly low dielectric constant number) and it may additionally enclose air, to reduce capacitive coupling to the ground or underground environment in which the marker device 300 is buried.

Figure 3B:
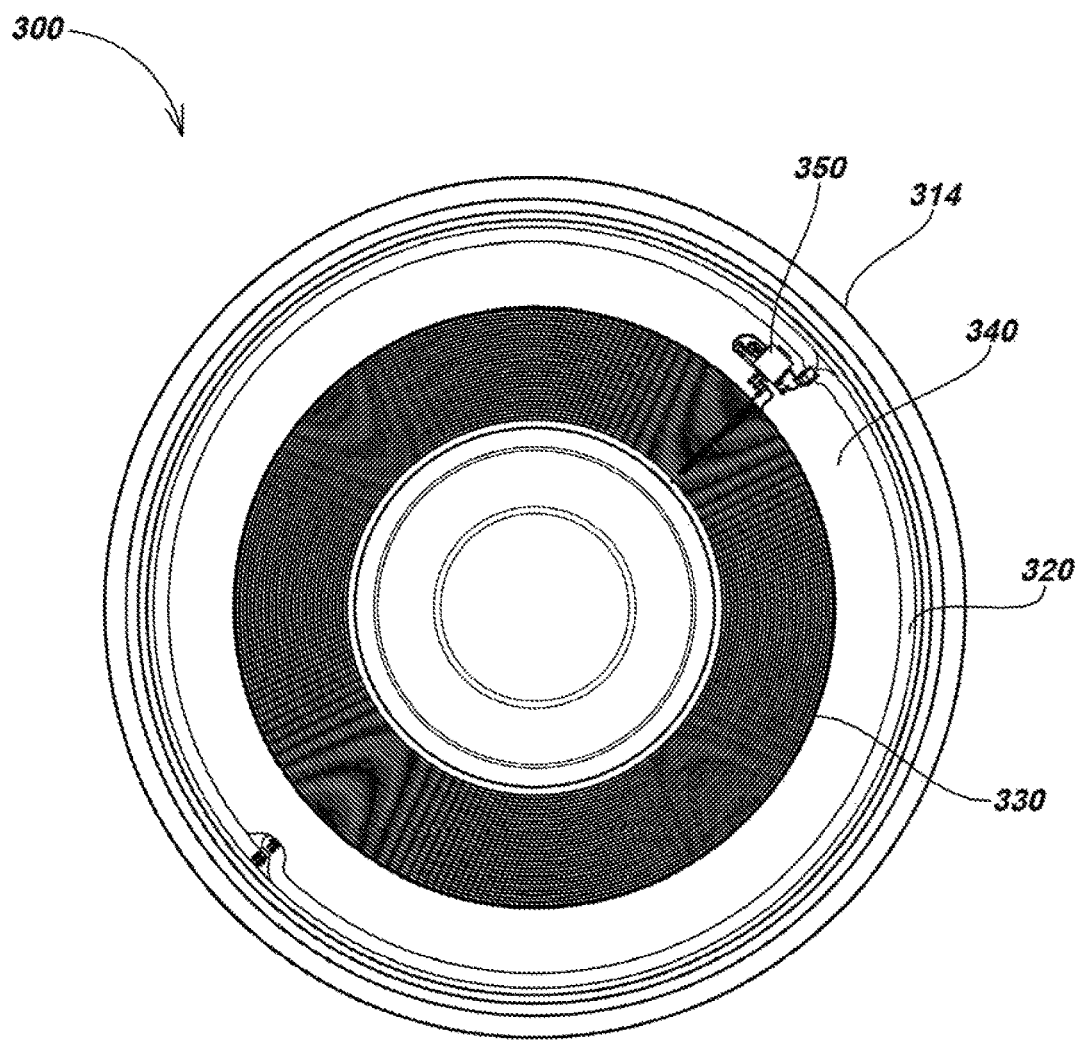
FIG. 3B is a section view of the marker device from FIG. 3A along line 3B-3B.
Figure 3C:
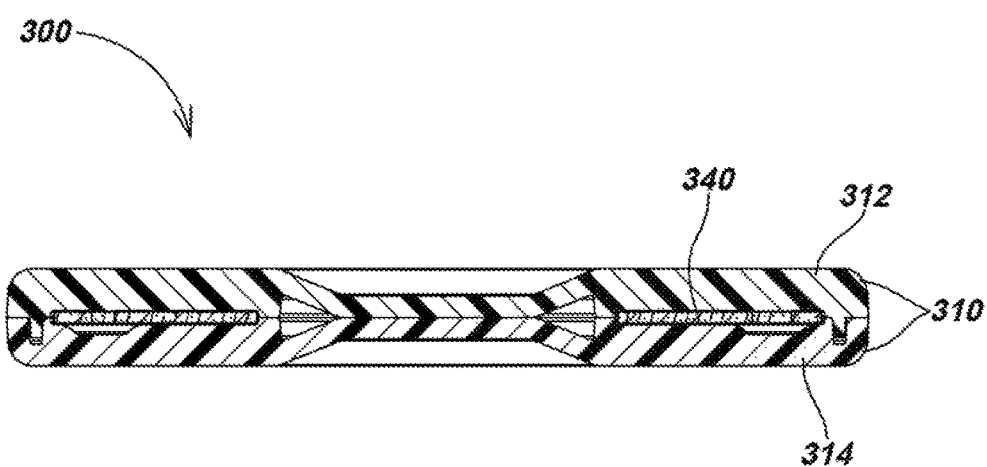
FIG. 3C is a section view of the marker device from FIG. 3A along line 3C-3C.

As illustrated in FIGS. 3A and 3C, the housing 310 may protect a loop or disc shaped printed circuit board (PCB) 340 (FIGS. 3B and 3C) from corrosive and otherwise damaging elements in the underground environment. The housing 310 of marker device 300 may comprise of two halves, a top housing half 312 and a bottom housing half 314, that may snap or otherwise couple snugly together in assembly. In other embodiments, over molding or like techniques, such as fusion welding or laser welding or spin welding, may be used to form a protective housing such as housing 310.

Figure 5:
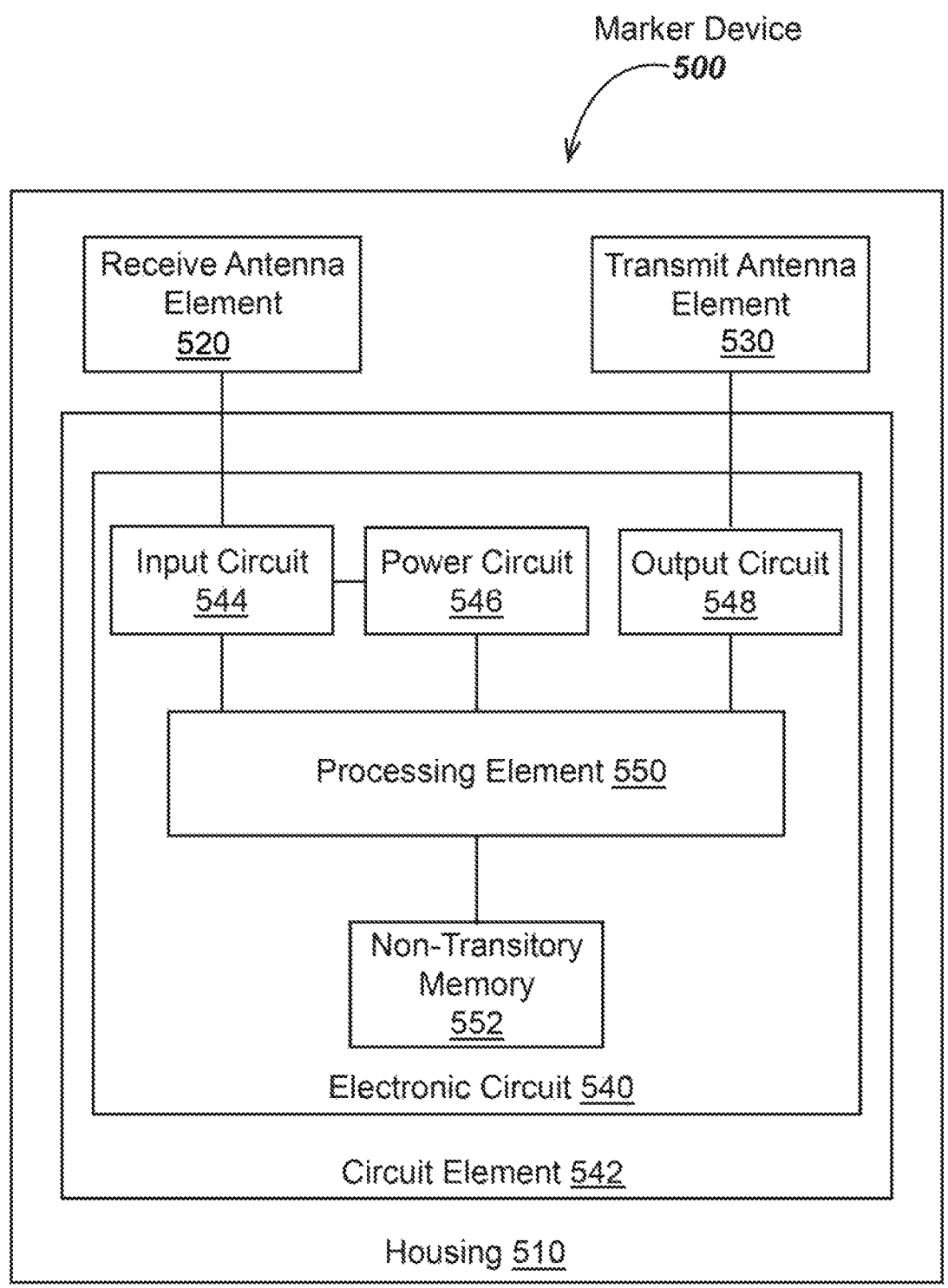
FIG. 5 illustrates a block diagram of a marker device.

Turning to FIG. 3B, the PCB 340 may include one or more circuit elements 350 which may be or share aspects with the circuit element 542 illustrated in FIG. 5. The circuit elements 350 may include an input circuit to receive the input signal from an above-ground transmitter, a power circuit to convert the input signal to a power supply for powering the electronic circuit, a processing element to generate the output signal responsive to the input signal, and an output circuit providing the output signal at a different frequency than the input signal frequency via the output antenna element. The circuit elements 350 may further include one or more non-transitory memories for storing programmed instructions used in controlling the circuit elements 350 and marker device 300. The output signal may further be received at an above-ground receiver to assist in determining the location of a buried object associated with the marker device 300.

The input circuit may electrically couple to a receive antenna element 320 (FIG. 3B) that may comprise one or more conductive traces on PCB 340. In marker device 300, the receive antenna element 320 may be a single trace near the outer circumference of the loop or disc shaped PCB 340. The trace of receive antenna element 320 may be 2 mm wide and may spiral along the outer circumference of PCB 340 a single time.

The output circuit may, likewise, electrically couple to a transmit antenna element 330 (FIG. 3B) that may comprise one or more traces on PCB 340. In marker device 300, the transmit antenna element 330 may be a single trace spiraling multiple times along the inner circumference of the loop or disc shaped PCB 340. The traces of transmit antenna element 330 may be 0.14 mm wide and may spiral along the inner circumference of PCB 340 62 times.

In other embodiments, the positions of the receive antenna element 320 and transmit antenna element 330 may be swapped or may otherwise be located along different locations of the PCB. Likewise, in other embodiments the receive antenna element 320 and transmit antenna element 330 may spiral along the circumference of the PCB a different number of times and/or may have different width of traces. It should also be noted that the receive antenna element 320 and transmit antenna element 330 may be physically spaced from one another to decouple resonance of the antenna elements 320 and 330.

Figure 4A:
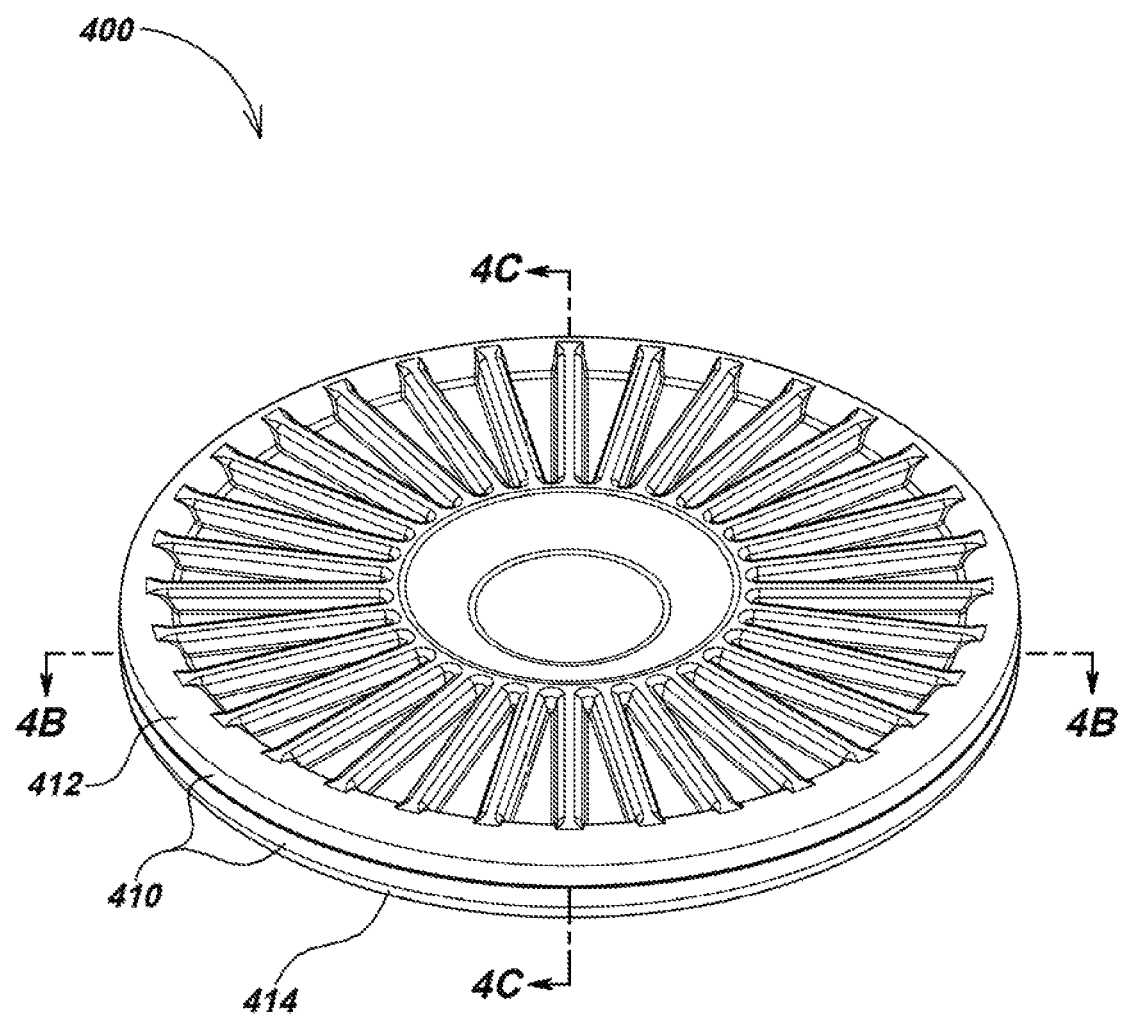
FIG. 4A is an isometric view of another marker device embodiment.

Turning to FIG. 4A, another marker device 400 in keeping with the present disclosure is illustrated. The marker device 400 may include a loop or disc shaped protective housing 410 made of materials having a low dielectric constant (e.g., polymers such as those having low dielectric constants: polypropylene (2.2-2.36), polyethylene (2.25), polystyrene (2.4-2.7), polytetrafluoroethylene (2.25), or other materials having a similarly low dielectric constant number) and it may additionally enclose air, to reduce capacitive coupling to the ground or underground environment in which the marker device 400 is buried.

Figure 4B:
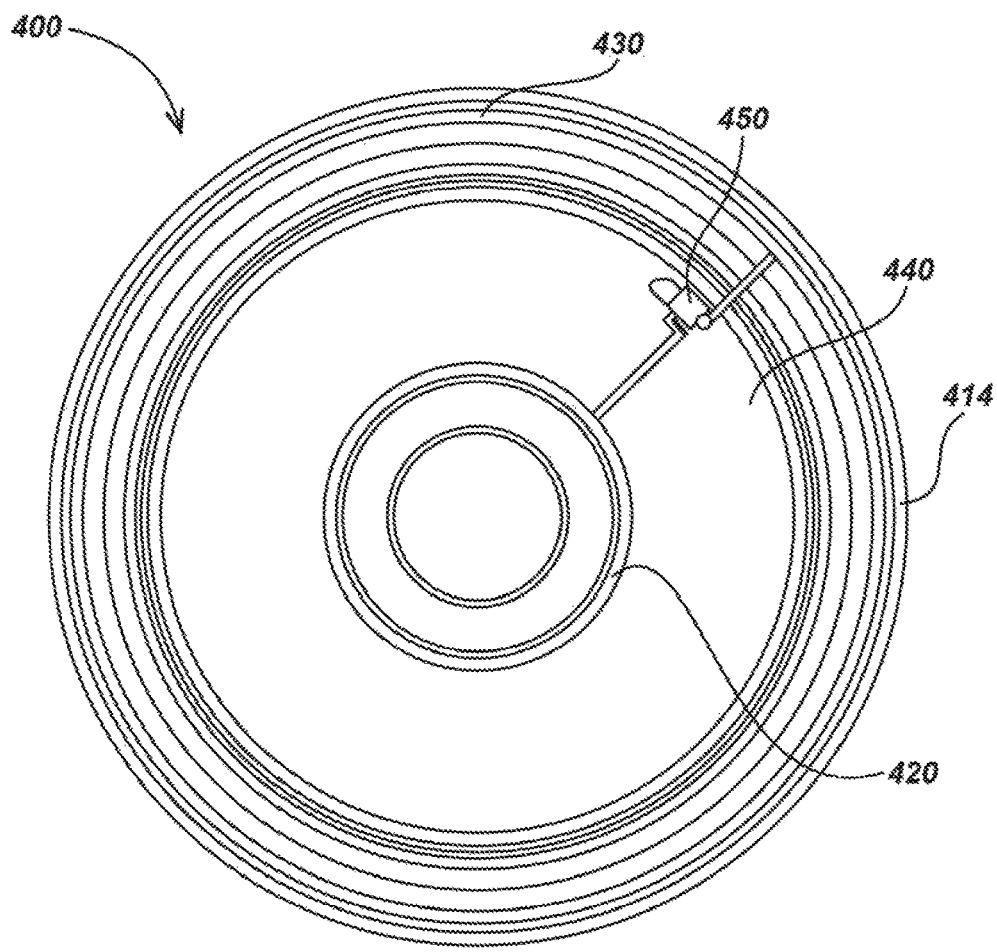
FIG. 4B is a section view of the marker device from FIG. 4A along line 4B-4B.
Figure 4C:
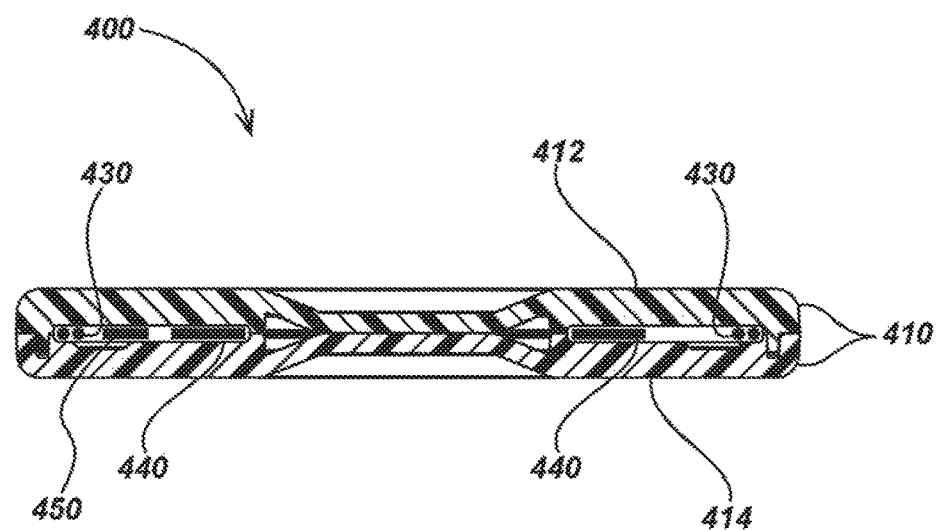
FIG. 4C is a section view of the marker device from FIG. 4A along line 4C-4C

As illustrated in FIGS. 4A and 4C, the housing 410 may protect a loop or disc shaped printed circuit board (PCB) 440 (FIGS. 4B and 4C) and a transmit antenna element 430 (FIGS. 4B and 4C) from corrosive and otherwise damaging elements in the underground environment. The housing 410 of marker device 400 may comprise of two halves, a top housing half 412 and a bottom housing half 414, that may snap or otherwise couple snugly together in assembly. In other embodiments, over molding or like techniques may be used to form a protective housing such as housing 410.

Turning to FIG. 4B, the PCB 440 may include one or more circuit elements 450 which may be or share aspects with the circuit element 542 of FIG. 5. The circuit elements 450 may include an input circuit to receive the input signal from an above-ground transmitter, a power circuit to convert the input signal to a power supply for powering the electronic circuit, a processing element to generate the output signal responsive to the input signal, and an output circuit providing the output signal at a different frequency than the input signal frequency via the output antenna element. The circuit elements 450 may further include one or more non-transitory memories for storing programmed instructions used in controlling the circuit elements 450 and marker device 400. The output signal may further be received at an above-ground receiver to assist in determining the location of a buried object associated with the marker device 400.

The input circuit may electrically couple to a receive antenna element 420 (FIG. 4B) that may comprise one or more conductive traces on PCB 440. In marker device 400, the receive antenna element 420 may be a single trace near the outer circumference of the loop or disc shaped PCB 440. The trace of receive antenna element 420 may be 2 mm wide and may spiral along the outer circumference of PCB 440 a single time.

The output circuit may, likewise, electrically couple to a transmit antenna element 430 (FIGS. 4B and 4C) that may comprise one or more turns of conductive wire. The transmit antenna element 430 of marker device 400 may comprise 2 turns of 12 AWG copper clad wire though in other embodiments, other types and gauges of wire having other numbers of turns may be used.

In other embodiments, the positions of the receive antenna element 420 and transmit antenna element 430 may be swapped. Likewise, the transmit antenna element may be traces on a PCB and/or the receive antenna element may comprise turns of conductive wire. It should also be noted that the receive antenna element 420 and transmit antenna element 430 may be physically spaced from one another to decouple resonance of the antenna elements 420 and 430.

Turning to FIG. 5, a block diagram of a marker device 500 is disclosed which may be or share aspects with the marker device 100 of FIG. 1, marker device 200 of FIGS. 2A-2C, marker device 300 of FIGS. 3A-3C, and/or marker device 400 of FIGS. 4A-4C. As illustrated, the marker device 500 may include a housing 510 encapsulating a receive antenna element 520, a transmit antenna element 530, and an electronic circuit 540. The electronic circuit 540 may include one or more circuit elements 542 which may be disposed on a PCB. Such circuit elements 542 may include, for example, an input circuit 544, a power circuit 546, an output circuit 548, a processing element 550, a non-transitory memory 552, and/or other circuit elements to carry out programmed instructions. One or more of these circuits may include tuning elements (e.g., small value capacitors), controlled and/or adjusted automatically based on program instructions stored in the non-transitory memory 552, for auto-tuning of the marker device 500.

Amongst the circuit elements, the input circuit 544 operates in conjunction with the receive antenna element 520 to receive an input signal from an above-ground transmitter. From the input signal, the power circuit extracts the electromagnetic energy and powers the marker device 500. The processing element 550 may process the received input signal to generate an output signal which is responsive to the input signal and has a frequency different from the frequency of the input signal. The generated output signal may be provided to the transmit antenna element 530 via the output circuit 548 whereby the transmitted signal may be received by the above-ground receiver. The output signal may assist in determining the location of the marker device 500 and associated buried object(s).

Additional marker device embodiments in accordance with aspects of the present disclosure may have various other form factors. For instance, the marker devices of the present disclosure may be fitted into a spherical marker device such as those disclosed in U.S. Pat. No. 4,712,094, issued Dec. 8, 1987, entitled SELF-ORIENTING PASSIVE MARKER STRUCTURE, incorporated by reference herein, which allows for self-righting of a marker element which may be or include the various loop or disc shaped embodiments described herein.

Figure 6A:
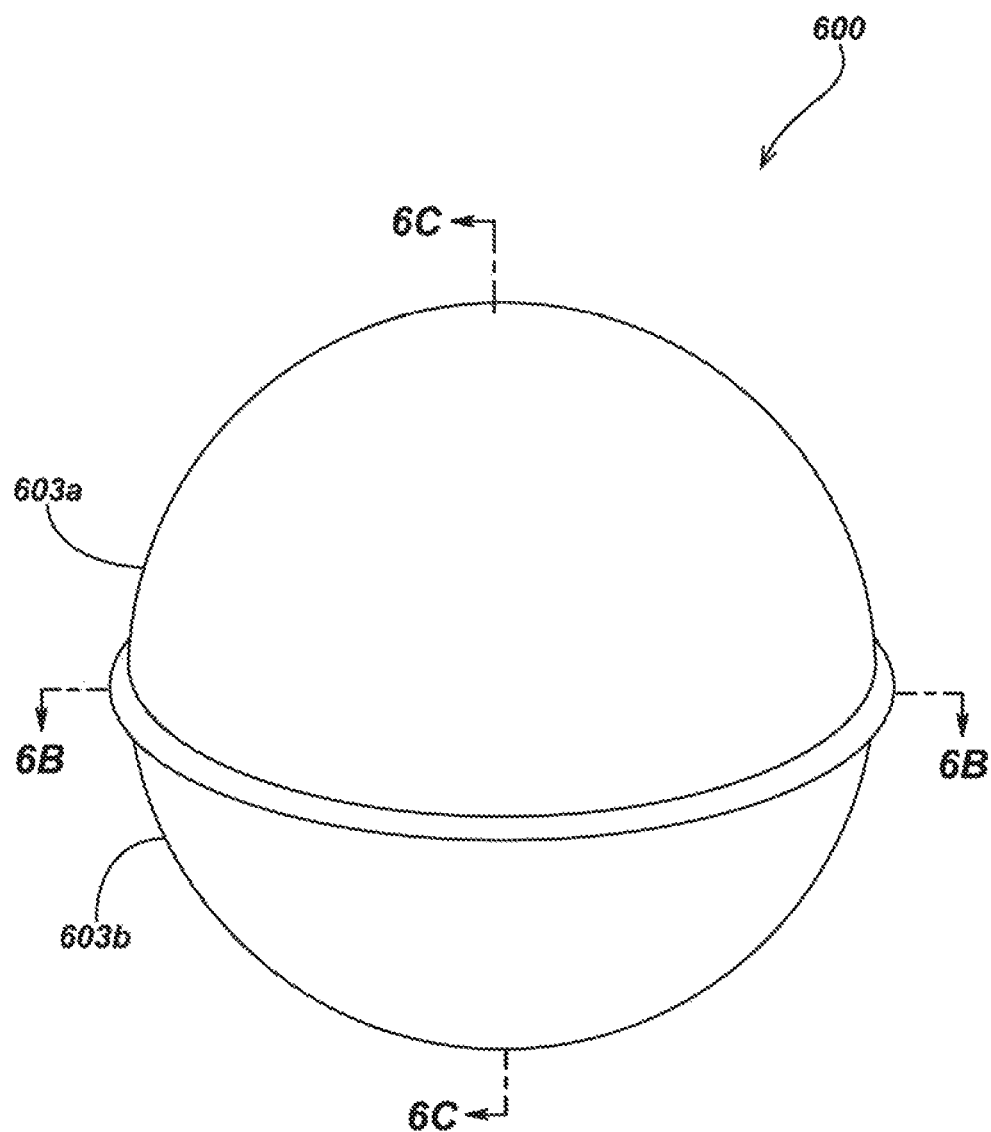
FIG. 6A is an isometric view of another marker device embodiment.

Turning to FIG. 6A, a marker device 600 is illustrated that may include a spherical outer shell 602. The spherical outer shell 602 may be made of materials having a low dielectric constant (e.g., polymers such as those having low dielectric constants: polypropylene (2.2-2.36), polyethylene (2.25), polystyrene (2.4-2.7), polytetrafluoroethylene (2.25), or other materials having a similarly low dielectric constant number) and it may additionally enclose air or, in some embodiments, other gases, to reduce capacitive coupling to the ground or underground environment in which the marker device 600 is buried. The outer shell 602 may include shell halves 603a and 603b that may mate together in assembly so as to retain a marker element 608 (FIGS. 6B and 6C) and a volume of fluid 606 (FIGS. 6B and 6C).

Figure 6B:
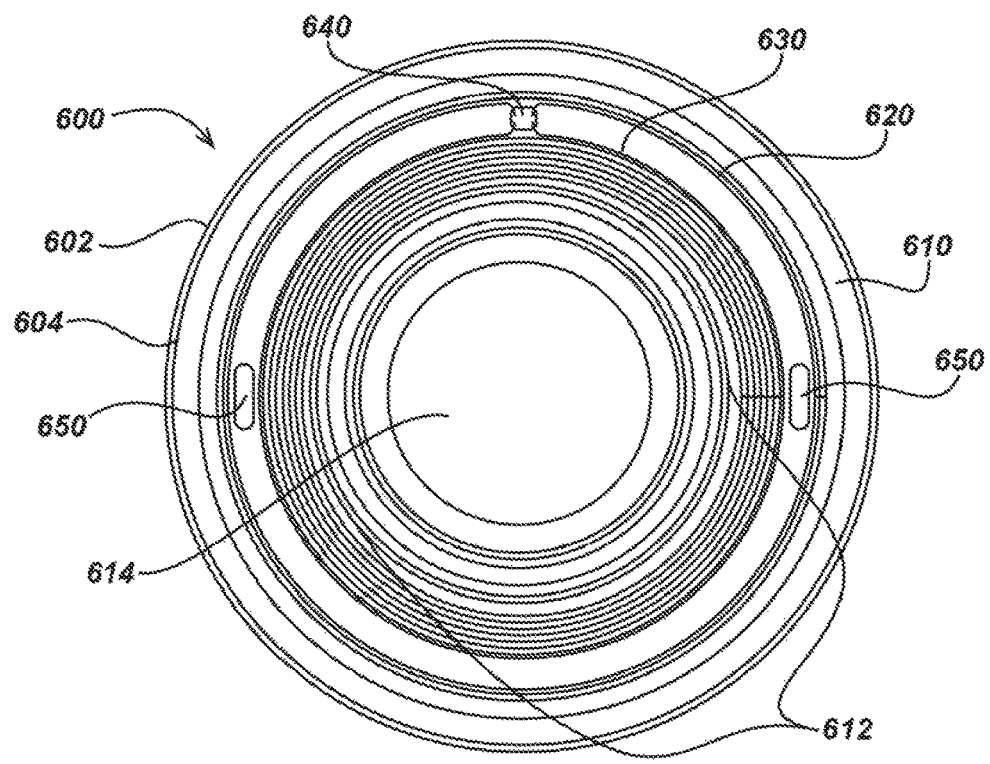
FIG. 6B is a section view of the marker device from FIG. 6A along line 6B-6B.
Figure 6C:
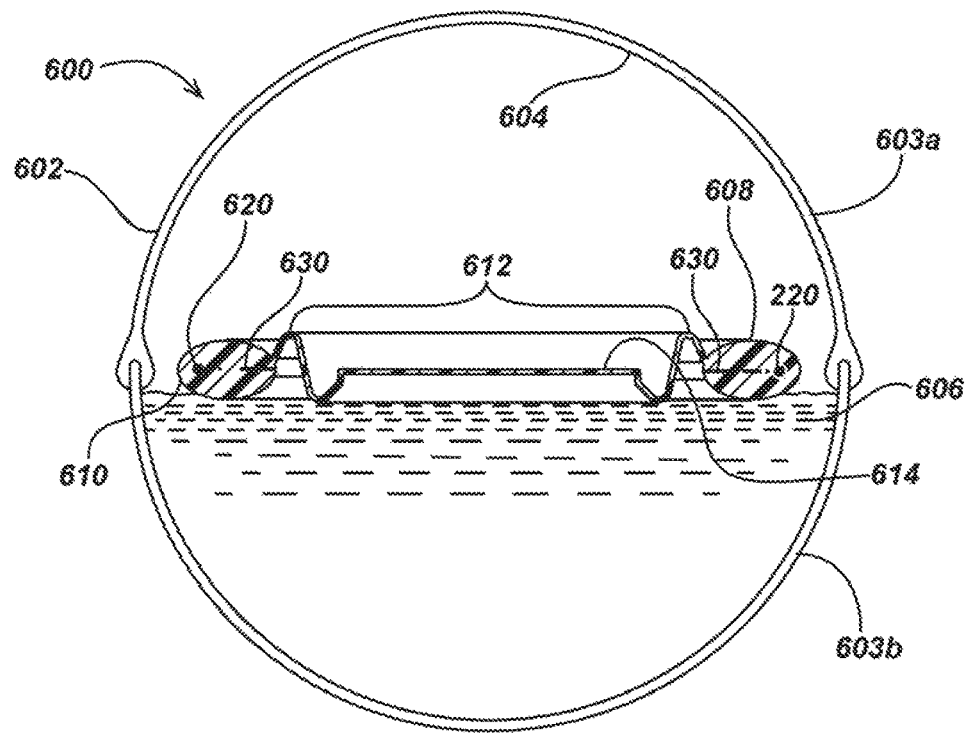
FIG. 6C is a section view of the marker device from FIG. 6A along line 6C-6C.

Turning to FIGS. 6B and 6C, the marker device 600 may have a hollow internal cavity 604. The internal cavity 604 may be partially filled with fluid 606 such that a buoyant marker element 608 may float therein allowing the marker element 608 to freely self-level to a horizontal position. The marker element 608 may be or share aspects with the marker device 200 of FIG. 2, marker device 300 of FIG. 3, or marker device 400 of FIG. 4. In the marker device 600, the marker element 608 may include a loop or disc shaped protective housing 610 that may prevent the ingress of fluid 606. The housing 610 may optionally be made of materials having a low dielectric constant (e.g., polymers such as those having low dielectric constants: polypropylene (2.2-2.36), polyethylene (2.25), polystyrene (2.4-2.7), polytetrafluoroethylene (2.25), or other materials having a similarly low dielectric constant number) and it may additionally enclose air or other dielectric gases (e.g., nitrogen, and the like), to reduce capacitive coupling to the ground or underground environment.

Still referring to FIGS. 6B and 6C, the marker element 608 may include a receive antenna element 620 and a transmit antenna element 630 physically spaced apart from each other concentrically and disposed in the housing 610. Spacing between the receive antenna element 620 and transmit antenna element 630 may be selected to decouple the resonance of the separate antenna elements. The receive antenna element 620 may comprise one or more loop or disc shaped conductive windings to receive an input signal, such as signal 108 of FIG. 1, at a first frequency from an above-ground transmitter device, such as the utility locating device 120 of FIG. 1. The conductive winding(s) of the receive antenna element 620 may be tuned to the first frequency of the input signal. In various embodiments in keeping with the present disclosure, different wire types or gauges of wire may be used wherein the receive antenna element 620.

The transmit antenna element 630 may include one or more loop or disc shaped conductive windings configured to broadcast an output signal, such as the output signal 110 of FIG. 1, at a different frequency than the input signal received at the receive antenna element 620. In various embodiments in keeping with the present disclosure, different wire types or gauges of wire may be used wherein the transmit antenna element 630.

An electronic circuit 640 may be disposed between the receive antenna element 620 and transmit antenna element 630 wherein traces on the circuit board may individually electrically connect to the conductive windings of the receive antenna element 620 and transmit antenna element 630. Electronic circuit 640 may be configured with an input circuit (e.g., input circuit 544 of FIG. 5) coupled to the receive antenna element 620 to receive an input signal that may be broadcast from an above-ground transmitter (e.g., built into a utility locating device or other separate transmitter device).

The electronic circuit 640 may further include a power circuit (e.g., power circuit 546 of FIG. 5) which may extract a portion or more of the electrometric energy from the input signal and convert it into a power supply to power the marker element 608 of the marker device 600. A processing element (e.g., processing element 550 of FIG. 5) included in the electronic circuit 640 may generate the output signal at a second frequency different from the frequency of the received input signal. The output signal at the second frequency may be generated, for example, by dividing down the input signal frequency by a predefined value, such as 128 or other divisor values, to generate the output signal. Other frequencies and divide ratios may alternatively be used in various embodiments based on particular operating environments, regulatory constraints, device constraints (e.g., power reduction, etc.), signal loss, and the like.

The electronic circuit 640 may include an output circuit (e.g., output circuit 548 of FIG. 5) to provide the output signal to the transmit antenna element 630 which may further broadcast the output signal received by an above-ground receiver (e.g., utility locating device 120 of FIG. 1). In some embodiments, the circuit elements may further include one or more non-transitory memories for storing programmed instruction used in controlling the circuit elements of electronic circuit 640 and marker device 600. The receiver element may further use the received output signal to determine the location of a marker device, such as the marker device 600, as well as associated utility lines or other objects. The electronic circuit 640 of marker element 608 may, in some embodiments, be an application-specific integrated circuit (ASIC).

The outer shell 602 and housing 610 may provide the electronic circuit 640 as well as the conductive windings of the receive antenna element 620 and transmit antenna element 630 a physical distance to reduce capacitive coupling of both input and output signals with the soil or other conductive elements in the soil and thereby reduce detuning of the marker element 608 of the marker device 600. The housing 610 and outer shell 602 may likewise prevent ingress of ions, further reducing detuning of the marker element 608 of the marker device 600.

As illustrated in FIG. 6B, the marker element 608 may optionally include desiccant 650 in one or more internal locations in housing 610. The desiccant 650 may keep internal humidity low and thus aid in preventing damage to the internal electronics such as electronic circuit 640. Other self-righting mechanisms may be used in the marker device embodiments of the present disclosure. One such embodiment is described a marker device 700 illustrated in FIGS. 7A-7C.

Figure 7A:
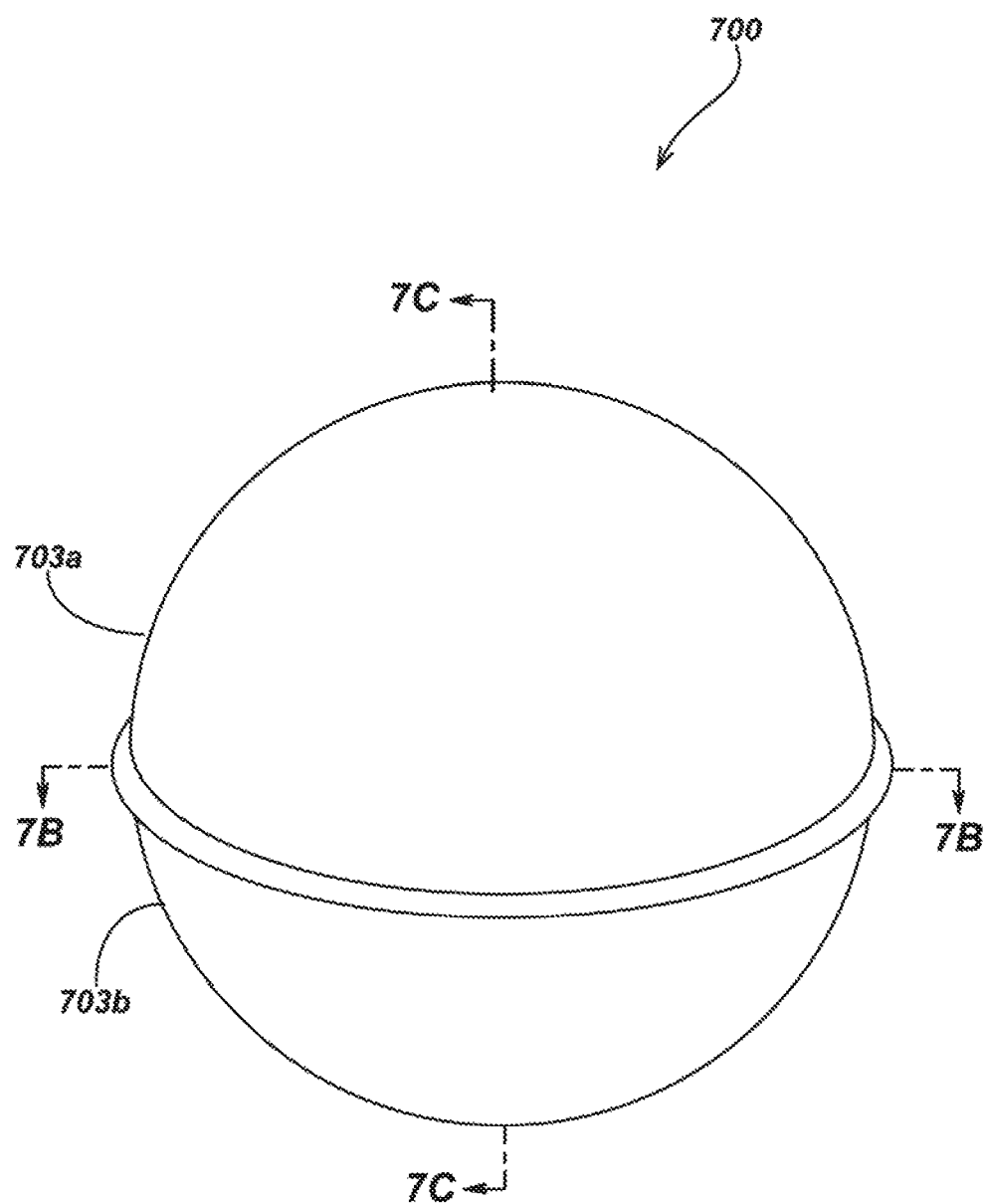
FIG. 7A is an isometric view of another marker device embodiment.

As illustrated in FIG. 7A, the marker device 700 may include a spherical outer shell 702. The spherical outer shell 702 may be made of materials having a low dielectric constant (e.g., polymers such as those having low dielectric constants: polypropylene (2.2-2.36), polyethylene (2.25), polystyrene (2.4-2.7), polytetrafluoroethylene (2.25), or other materials having a similarly low dielectric constant number) and it may additionally enclose air, to reduce capacitive coupling to the ground or underground environment in which the marker device 600 is buried. The outer shell 702 may include shell halves 703a and 703b that may mate together in assembly so as to retain a marker element 708 (FIGS. 7B and 7C) and a weight element 706 (FIGS. 7B and 7C).

Figure 7B:
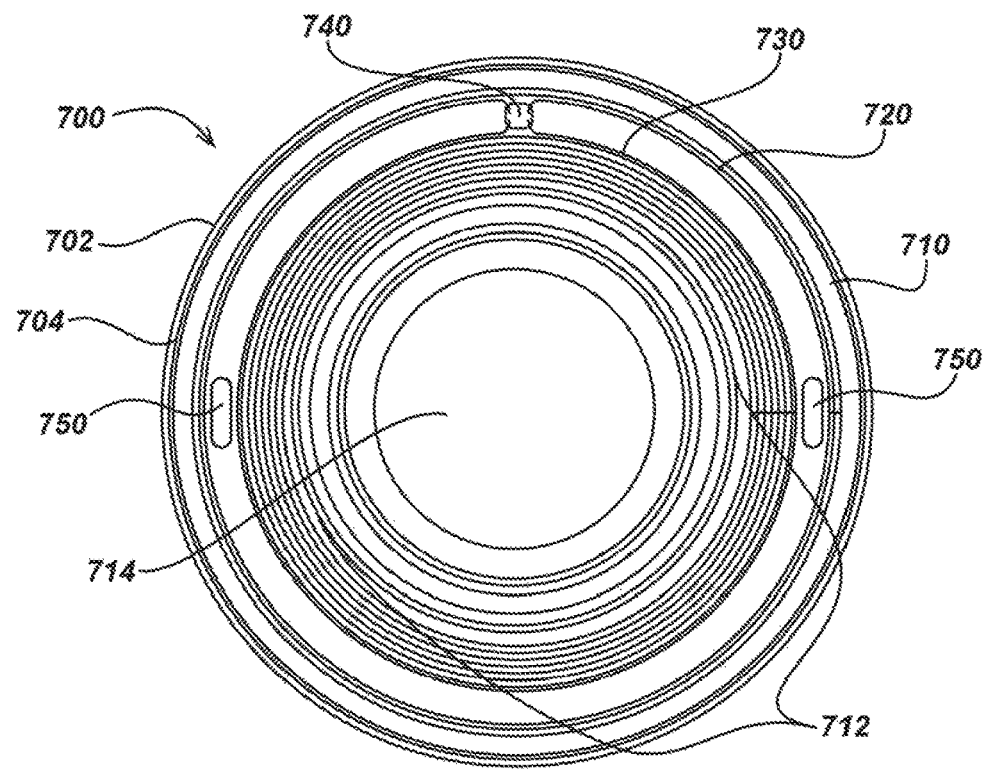
FIG. 7B is a section view of the marker device from FIG. 7A along line 7B-7B.
Figure 7C:
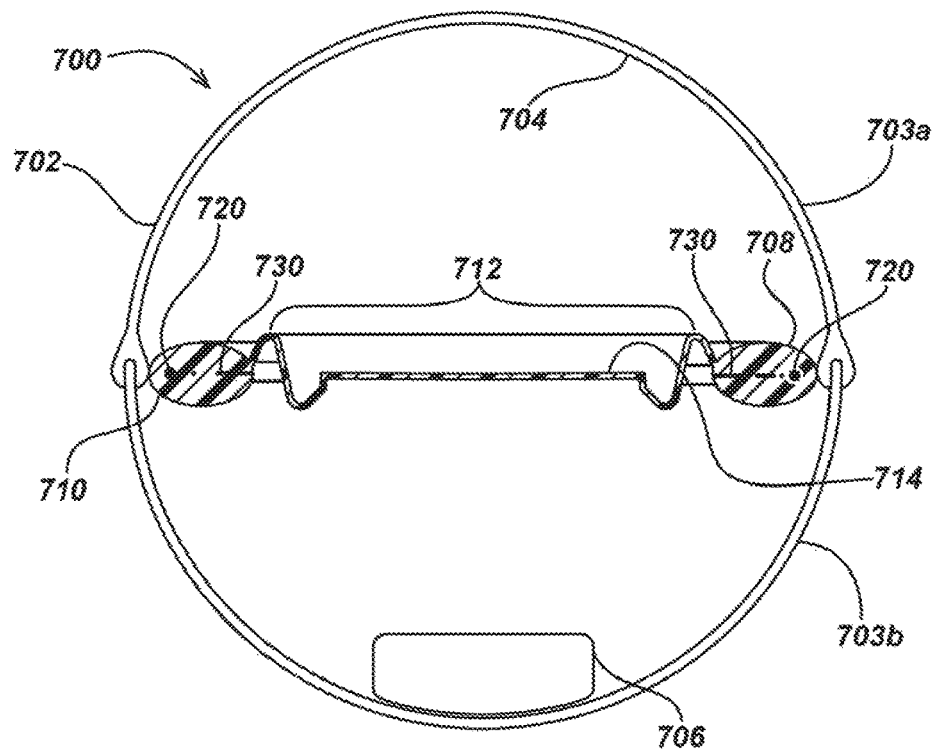
FIG. 7C a section view of the marker device from FIG. 7A along line 7C-7C.

Turning to FIGS. 7B and 7C, the marker device 700 may have a hollow internal cavity 704. The internal cavity 704 may house the weighted element 706 along a bottom portion of shell half 703b and a marker element 708 which may be or share aspects with the marker device 200 of FIG. 2, marker device 300 of FIG. 3, or marker device 400 of FIG. 4. The marker element 708 may located approximately inside or at the equatorial region of the spherical outer shell 702. The weighted element 706 may cause the marker device 700 to be weighted along one side such that, in use, the effect of gravity may cause the marker device 700 to self-orient with the weighted element 706 positioned nearest the ground and the marker element 708 to be substantially horizontal as the marker device 700 is tossed or otherwise placed near or above a utility line or other marked location. In some embodiments the hollow internal cavity may be filled with a dielectric gas such as air, nitrogen, or other dielectric gas materials.

The marker element 708 may include a loop or disc shaped protective housing 710 that may couple along or near an equatorial diameter of the marker device 700. In other embodiments, the marker element may instead be built into the outer shell. The housing 710 may optionally be made of materials having a low dielectric constant (e.g., polymers such as those having low dielectric constants: polypropylene (2.2-2.36), polyethylene (2.25), polystyrene (2.4-2.7), polytetrafluoroethylene (2.25), or other materials having a similarly low dielectric constant number) and it may additionally enclose air, to reduce capacitive coupling to the ground or underground environment. in further embodiments, the outer shell Still referring to FIGS. 7B and 7C, the marker element 708 may include a receive antenna element 720 and a transmit antenna element 730 physically spaced apart from each other concentrically and disposed in the housing 710. Spacing between the receive antenna element 720 and transmit antenna element 730 may be selected to decouple the resonance of the separate antenna elements. The receive antenna element 720 may comprise one or more loop or disc shaped conductive windings to receive an input signal, such as signal 108 of FIG. 1, at a first frequency from an above-ground transmitter device, such as the utility locating device 120 of FIG. 1. The conductive winding(s) of the receive antenna element 720 may be tuned to the first frequency of the input signal. In various embodiments in keeping with the present disclosure, different wire types or gauges of wire may be used wherein the receive antenna element 720.

The transmit antenna element 730 may include one or more loop or disc shaped conductive windings configured to broadcast an output signal, such as the output signal 110 of FIG. 1, at a different frequency than the input signal received at the receive antenna element 620. In various embodiments in keeping with the present disclosure, different wire types or gauges of wire may be used wherein the transmit antenna element 730.

An electronic circuit 740 may be disposed between the receive antenna element 720 and transmit antenna element 730 wherein traces on the circuit board may individually electrically connect to the conductive windings of the receive antenna element 720 and transmit antenna element 730. Electronic circuit 740 may be configured with an input circuit (e.g., input circuit 544 of FIG. 5) coupled to the receive antenna element 720 to receive an input signal that may be broadcast from an above-ground transmitter (e.g., built into a utility locating device or other separate transmitter device). The electronic circuit 740 may further include a power circuit (e.g., power circuit 546 of FIG. 5) which may extract a portion or more of the electrometric energy from the input signal and convert it into a power supply to power the marker element 708 of the marker device 700. A processing element (e.g., processing element 550 of FIG. 5) included in the electronic circuit 740 may generate the output signal at a second frequency different from the frequency of the received input signal. The output signal at the second frequency may be generated, for example, by dividing down the input signal frequency by a predefined value, such as 128 or other divisor values, to generate the output signal.

Other frequencies and divide ratios may alternatively be used in various embodiments based on particular operating environments, regulatory constraints, device constraints (e.g., power reduction, etc.), signal loss, and the like. The electronic circuit 740 may include an output circuit (e.g., output circuit 548 of FIG. 5) to provide the output signal to the transmit antenna element 730 which may further broadcast the output signal received by an above-ground receiver (e.g., utility locating device 120 of FIG. 1). In some embodiments, the circuit elements may further include one or more non-transitory memories for storing programmed instruction used in controlling the circuit elements of electronic circuit 740 and marker device 700. The receiver element may further use the received output signal to determine the location of a marker device, such as the marker device 700, as well as associated utility lines or other objects. The electronic circuit 740 of marker element 708 may, in some embodiments, be an application-specific integrated circuit (ASIC).

The outer shell 702 and housing 710 may provide the electronic circuit 740 as well as the conductive windings of the receive antenna element 720 and transmit antenna element 730 a physical distance to reduce capacitive coupling of both input and output signals with the soil or other conductive elements in the soil and thereby reduce detuning of the marker element 708 of the marker device 700. The housing 710 and outer shell 702 may likewise prevent ingress of ions, further reducing detuning of the marker element 708 of the marker device 700.

As illustrated in FIG. 7B, the marker element 708 may optionally include desiccant 750 in one or more internal locations in housing 710. The desiccant 750 may keep internal humidity low and thus aid in preventing damage to the internal electronics such as electronic circuit 740.

Those of skill in the art would understand that information and signals, such input/output signals or data, and/or other signals/other data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans may implement the described functionality in varying ways for each particular application, but such implementation decisions should not be interpreted as causing a departure from the scope of the present disclosure.

The various illustrative functions and circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The features described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known or developed in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in the marker device disclosed herein.

The scope of the present invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the disclosures herein. Thus, the presently claimed invention is not intended to be limited to the aspects shown herein, but is to be accorded the widest scope consistent with the following claims and their equivalents.

We claim:

1. A marker device for use with a buried utility locating system, comprising:
   a housing comprising a material having a low dielectric constant;
   a receive antenna element comprising one or more conductive windings tuned to an input signal at a first frequency;
   a transmit antenna element comprising one or more conductive windings to broadcast an output signal at a second frequency, different from the first frequency, and positioned to be physically separated concentrically from the receive antenna element so as decouple the resonance of the separate antenna elements;
   an electronic circuit comprising:
   a printed circuit board electrically coupled separately to conductive windings of the receive and transmit antenna elements, the circuit board including electrical traces and connecting elements to electrically couple the conductive windings to the electrical traces on the circuit board;

an input circuit to receive, via the receive antenna element, the input signal at the first frequency from an above-ground transmitter;

a power circuit to convert the input signal to a power supply for powering the electronic circuit;

a processing element to generate an output signal at a second frequency responsive to the input signal wherein the second frequency is outside the resonant range of the first frequency; and an output circuit to provide the output signal to the transmit antenna element to be broadcast to an above-ground receiver to assist in determining a location of the buried object.

2. The marker device of claim 1, wherein the conductive windings are shaped in a loop.

3. The marker device of claim 1, further comprising a platform disposed in the middle of the housing having a surface shaped and textured for securing labels.

4. The marker device of claim 3, wherein the platform is moveably coupled to the housing to reduce transfer stress and/or deformation of the antenna elements.

5. The marker device of claim 1, wherein the receive antenna windings are spaced outward, concentrically, from the transmit antenna windings.

6. The marker device of claim 2, wherein the receive and/or transmit antenna windings comprise copper and are tuned, respectively, to the first and second frequencies.

7. The marker device of claim 6, wherein the transmit antenna windings are tuned to the second frequency by selecting the number of turns of the windings to correspond with the second frequency.

8. The marker device of claim 1, wherein the electronic circuit comprises an application-specific integrated circuit (ASIC).

9. The marker device of claim 1, wherein the above-ground transmitter is integrated in a magnetic field sensing buried utility locating device.

10. The marker device of claim 9, wherein the above-ground receiver comprises the antenna arrays and receiver circuit of a magnetic field sensing buried utility locating device.

11. The marker device of claim 1, wherein the above-ground receiver comprises the antenna arrays and receiver circuit of a magnetic field sensing buried utility locating device.

12. The marker device of claim 1, wherein the conductive windings of the receive antenna element and the transmit antenna element are traces on the printed circuit board.

13. The marker device of claim 1, wherein the electronic circuit further includes one or more non-transitory memories for storing programmed instruction to control the marker device.

14. The marker device of claim 1, further including desiccant disposed internal to the housing.

15. The marker device of claim 1, wherein the marker device is disposed in a hollow ball partially filled with fluid and weighted so that it floats in the fluid, making the marker device self-righting.

16. The marker device of claim 1, wherein the marker device is disposed in a hollow ball weighted along one side.

17. The marker device of claim 16, wherein the hollow ball is filled with a dielectric gas.

18. The marker device of claim 1, wherein the low dielectric material comprises polypropylene, polyethylene, or polystyrene.

19. The marker device of claim 1, wherein the housing is disk-shaped.

20. The marker device of claim 1, wherein the printed circuit board is disk-shaped.

21. The marker device of claim 1, wherein the second frequency is the first frequency divided down by 128.

* * * * *